(12) United States Patent
Yang et al.

(10) Patent No.: US 11,987,071 B2
(45) Date of Patent: May 21, 2024

(54) DEVICE WITH BACKLIT COLORED DISPLAY AND METHOD OF MANUFACTURE

(71) Applicants: Jianqiao Yang, North York (CA); Chulong Yang, North York (CA)

(72) Inventors: Jianqiao Yang, North York (CA); Chulong Yang, North York (CA)

( * ) Notice: Subject to any disclaimer, the term of this patent is extended or adjusted under 35 U.S.C. 154(b) by 0 days.

(21) Appl. No.: 18/305,515

(22) Filed: Apr. 24, 2023

(65) Prior Publication Data

US 2023/0249492 A1 Aug. 10, 2023

Related U.S. Application Data

(63) Continuation-in-part of application No. PCT/CN2021/125958, filed on Oct. 25, 2021.

(30) Foreign Application Priority Data

Oct. 26, 2020 (CN) .......................... 202022428459.5
May 3, 2022 (CN) .......................... 202221070638.9
(Continued)

(51) Int. Cl.
*F21V 8/00* (2006.01)
*B32B 3/30* (2006.01)
(Continued)

(52) U.S. Cl.
CPC ................. *B44F 1/06* (2013.01); *B32B 3/30* (2013.01); *B32B 9/002* (2013.01); *B32B 17/06* (2013.01);
(Continued)

(58) Field of Classification Search
CPC ............. G09F 13/00; G09F 13/12; B44F 1/06
See application file for complete search history.

(56) References Cited

U.S. PATENT DOCUMENTS

| 8,721,151 B2 | 5/2014 | Wang et al. |
| 10,692,407 B2 * | 6/2020 | Dunn ...................... G09F 23/00 |
| (Continued) | | |

FOREIGN PATENT DOCUMENTS

| CN | 2295619 Y | 10/1998 |
| CN | 101618657 A | 1/2010 |
| (Continued) | | |

OTHER PUBLICATIONS

International Search Report dated Jan. 25, 2022 issued in international application No. PCT/CN2021/125958 (6 pages).

*Primary Examiner* — Eric T Eide

(57) ABSTRACT

A device for displaying images having variable colors comprises a substrate; a light-transmissive coloring layer painted or laminated on the substrate, the coloring layer comprising colorants of different colors and having a rear side in contact with the substrate and a varnished front side; a display layer comprising a silvering material directly plated on the varnished front side of the coloring layer, the display layer comprising a display pattern forming a visible displayed image, the silvering material comprising a metal, a metalloid, or an oxide thereof to form a one-way-mirror; an illuminator configured and positioned to illuminate the coloring layer from the rear side of the coloring layer. When the coloring layer is unilluminated by the illuminator, the unilluminated coloring layer is hidden behind the one-way-mirror. When the coloring layer is illuminated by the illuminator, the illuminated coloring layer visibly colorizes the displayed image through the one-way-mirror.

20 Claims, 11 Drawing Sheets

(30) Foreign Application Priority Data

Sep. 19, 2022 (CN) .......................... 202222491588.8
Sep. 27, 2022 (CN) .......................... 202222570333.0
Nov. 28, 2022 (CN) .......................... 202223168465.7

(51) Int. Cl.
| | | |
|---|---|---|
| *B32B 9/00* | (2006.01) | |
| *B32B 17/06* | (2006.01) | |
| *B44C 5/04* | (2006.01) | |
| *B44F 1/06* | (2006.01) | |
| *F21V 9/08* | (2018.01) | |

(52) U.S. Cl.
CPC .............. *B44C 5/0438* (2013.01); *F21V 9/08* (2013.01); *G02B 6/006* (2013.01); *G02B 6/0068* (2013.01); *B32B 2255/26* (2013.01); *B32B 2255/28* (2013.01); *B32B 2307/412* (2013.01); *B32B 2551/00* (2013.01)

(56) References Cited

U.S. PATENT DOCUMENTS

| | | | |
|---|---|---|---|
| 2007/0273277 A1* | 11/2007 | Fryer | .................... F21V 14/003 |
| | | | 313/506 |
| 2009/0086486 A1 | 4/2009 | Hsieh et al. | |
| 2020/0307302 A1* | 10/2020 | Arai | ......................... B32B 21/06 |
| 2022/0341585 A1* | 10/2022 | Perry | .................... G02B 6/0088 |
| 2022/0404530 A1* | 12/2022 | Araya | .................. G02B 5/0294 |

FOREIGN PATENT DOCUMENTS

| | | |
|---|---|---|
| CN | 205894435 U | 1/2017 |
| CN | 206495439 U | 9/2017 |
| CN | 111746186 A | 10/2020 |
| CN | 213383688 U | 6/2021 |
| CN | 214138077 U | 9/2021 |
| JP | 4781483 B1 | 9/2011 |
| JP | 2020040279 A | 3/2020 |
| JP | 7093514 B2 | 6/2022 |
| JP | 7272841 B2 | 5/2023 |

* cited by examiner

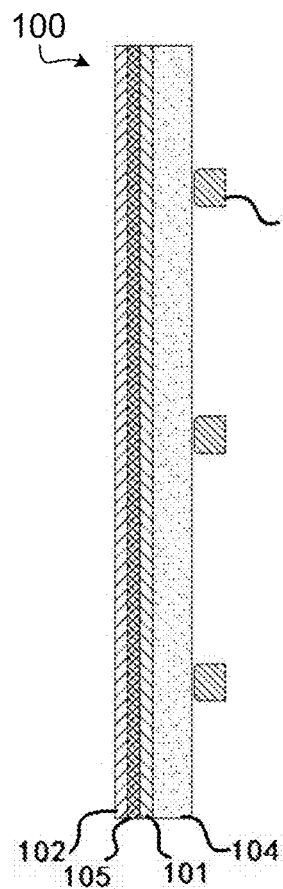 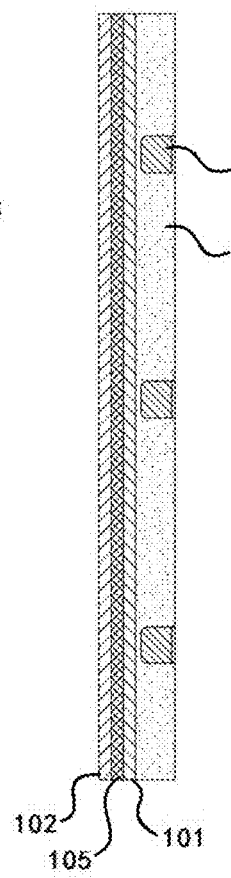 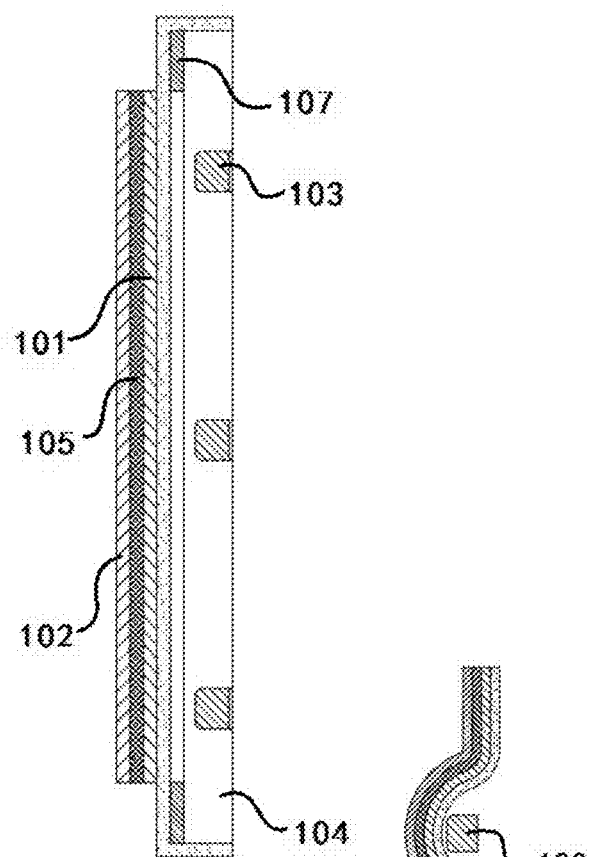 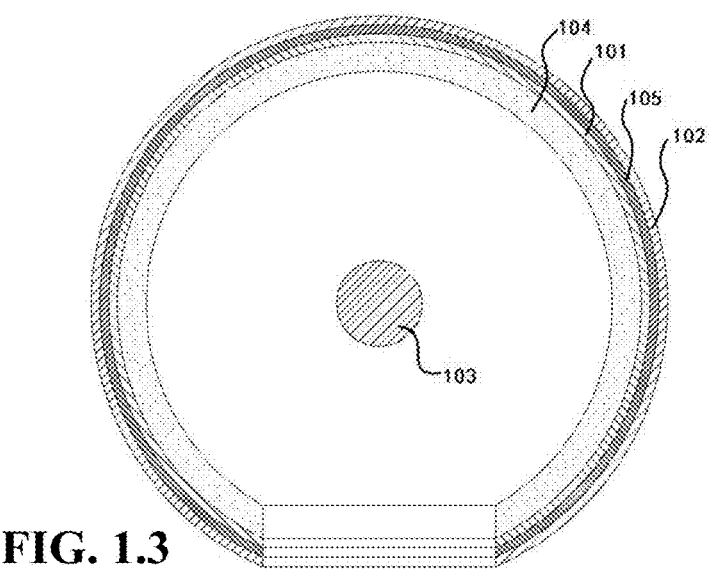 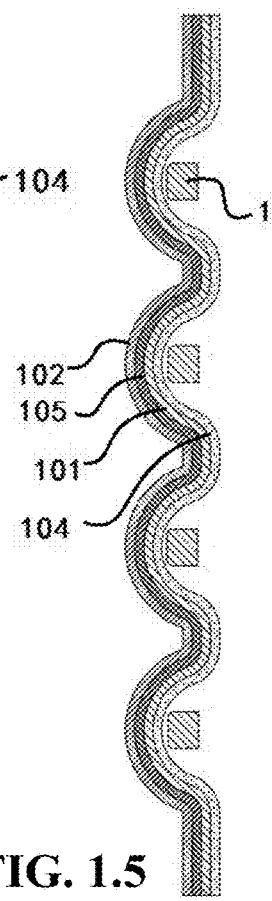
FIG. 1.1  FIG. 1.2  FIG. 1.4
FIG. 1.3  FIG. 1.5

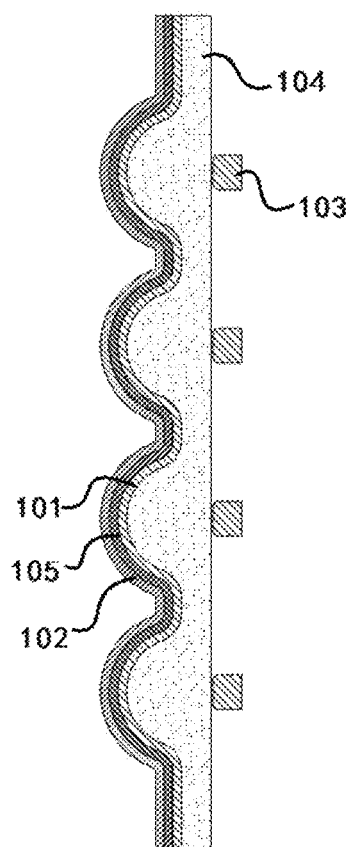 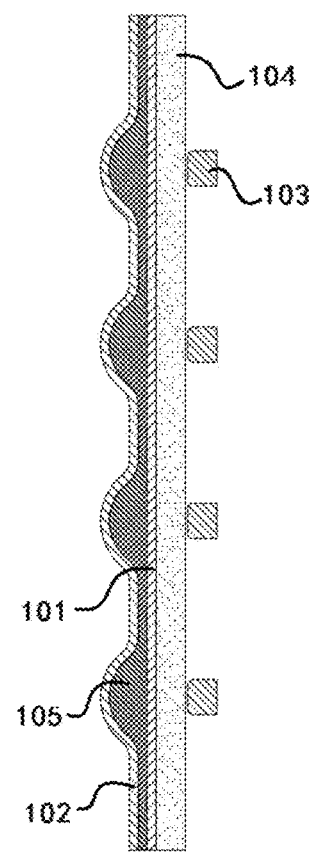 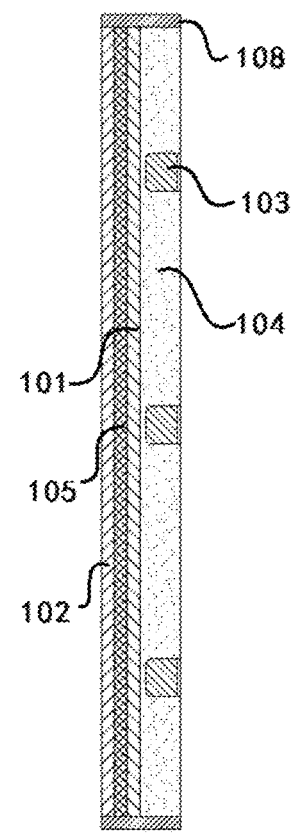
FIG. 1.6  FIG. 1.7  FIG. 1.8
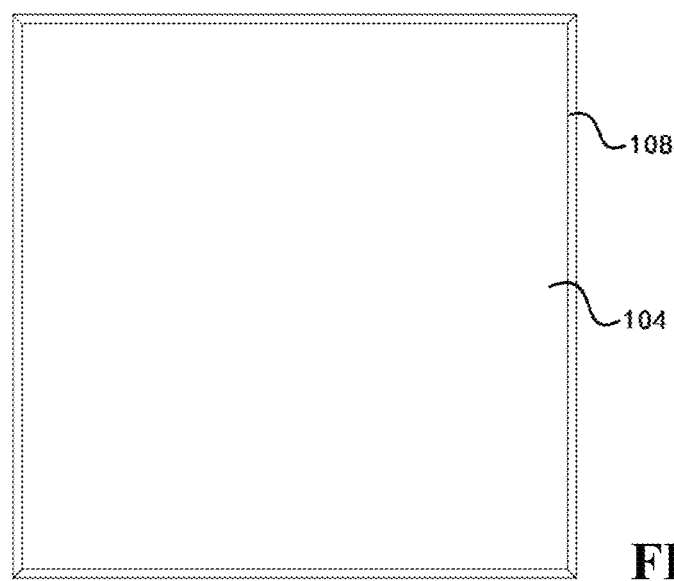
FIG. 1.9

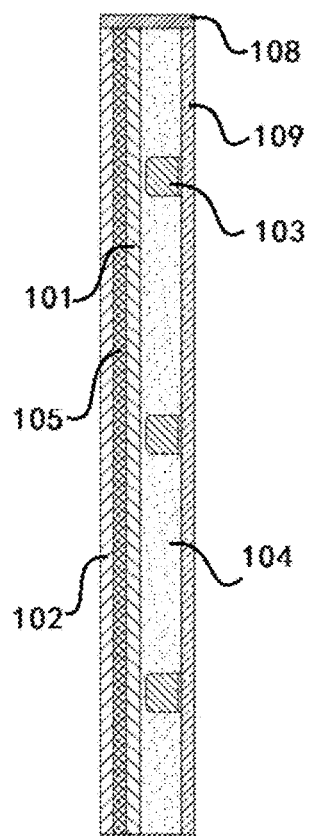
FIG. 1.10
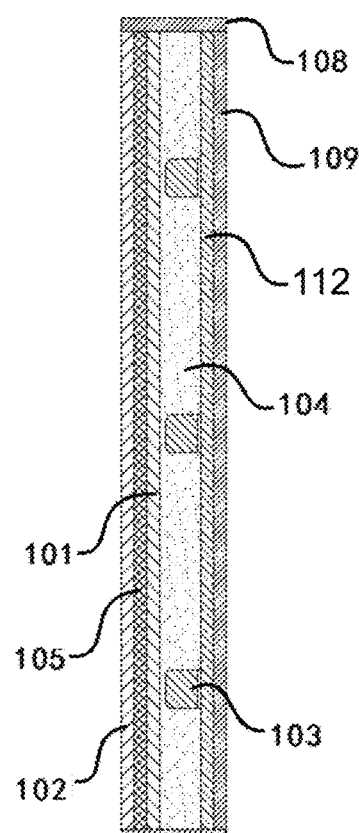
FIG. 1.11
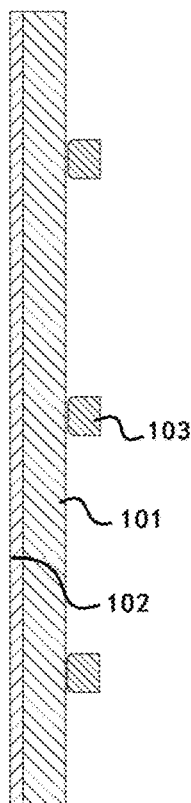
FIG. 1.12
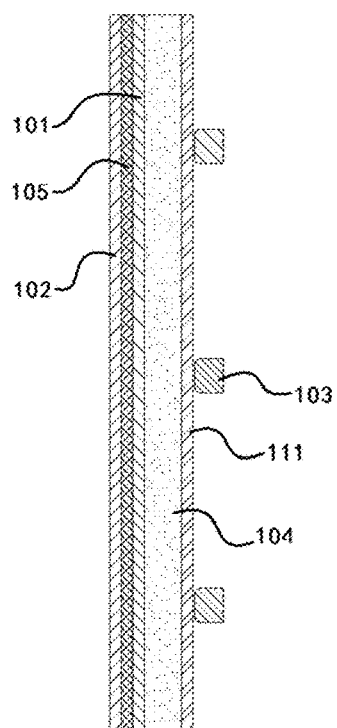
FIG. 1.13
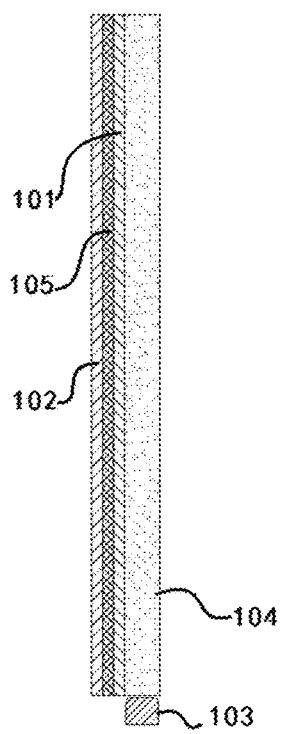
FIG. 1.14
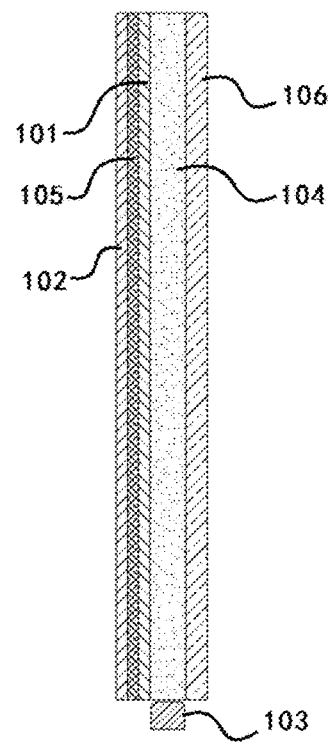
FIG. 1.15

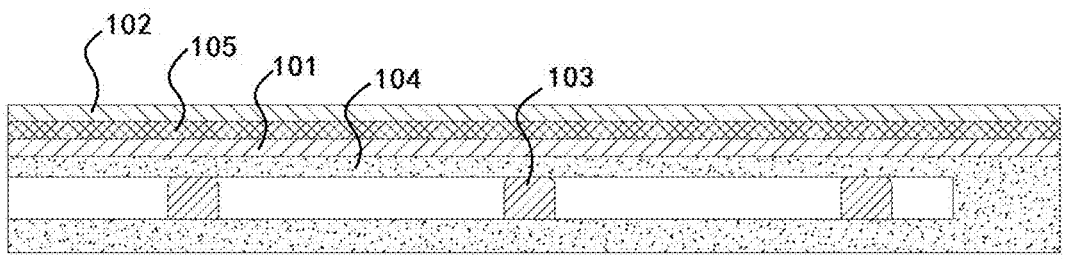
FIG. 1.16
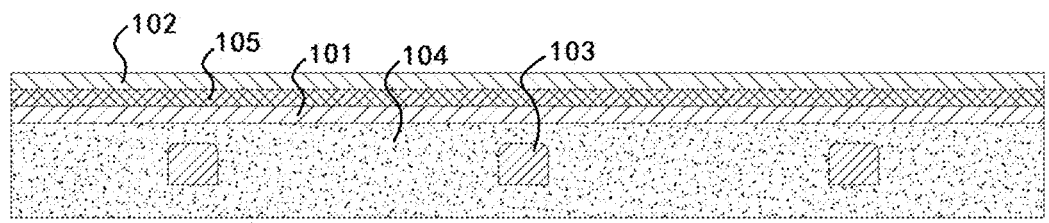
FIG. 1.17
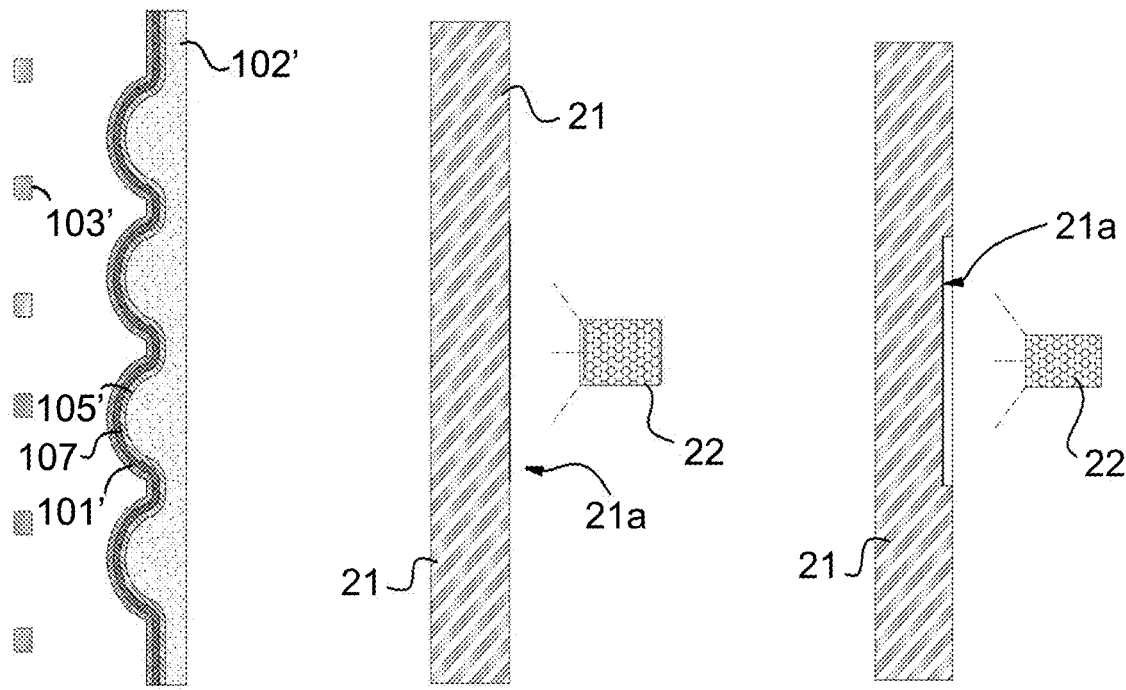
FIG. 1.18  FIG. 2.1  FIG. 2.2

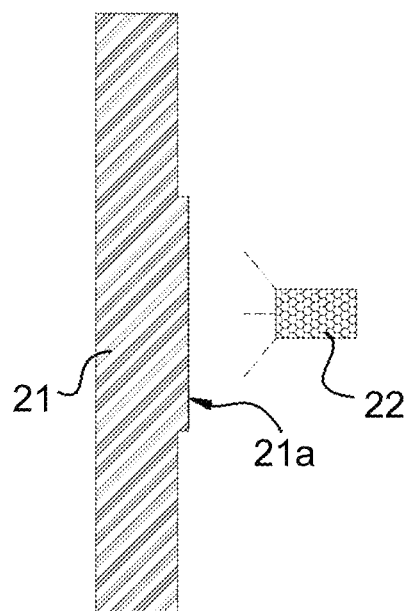
FIG. 2.3
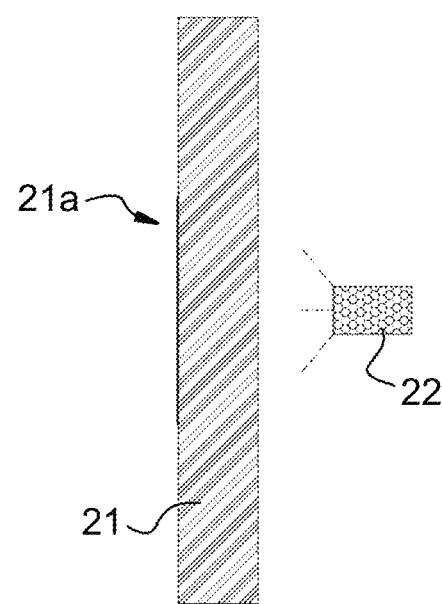
FIG. 2.4
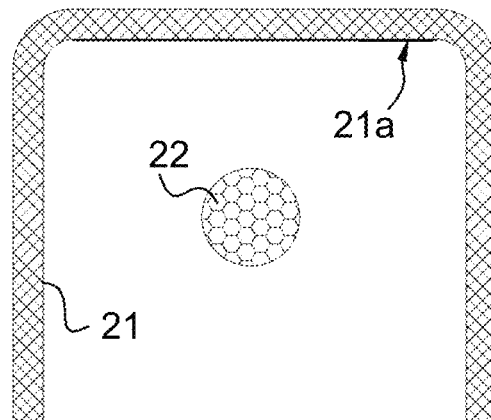
FIG. 2.5
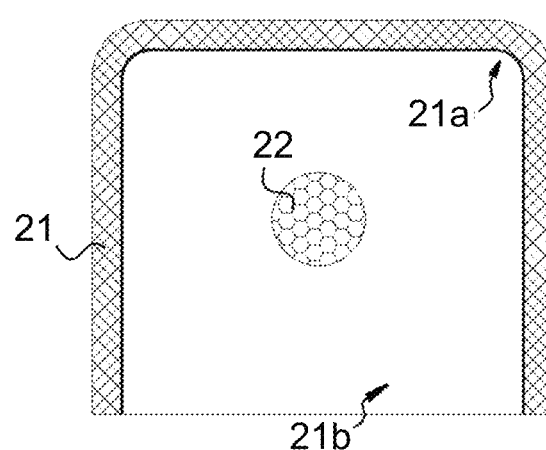
FIG. 2.6
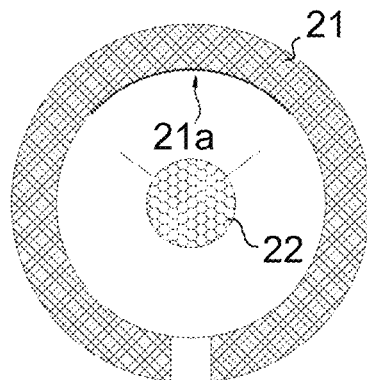
FIG. 2.7
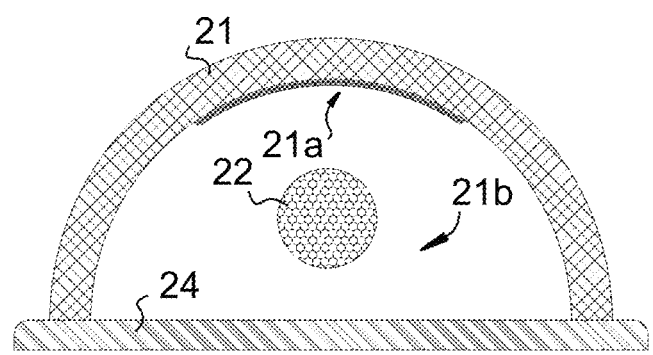
FIG. 2.8

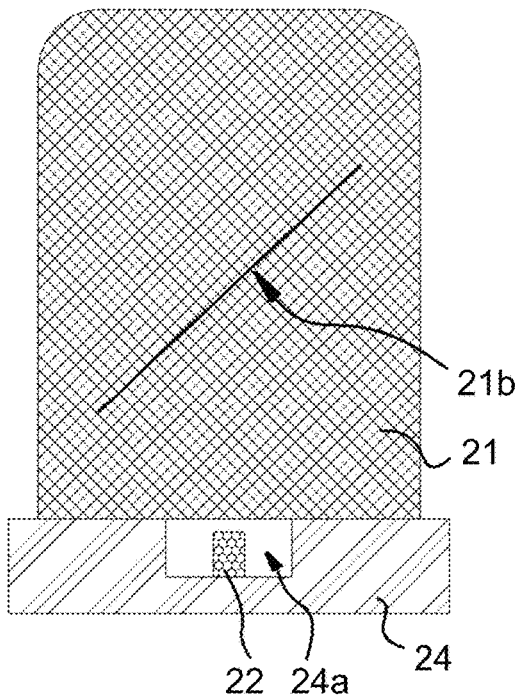
FIG. 2.9
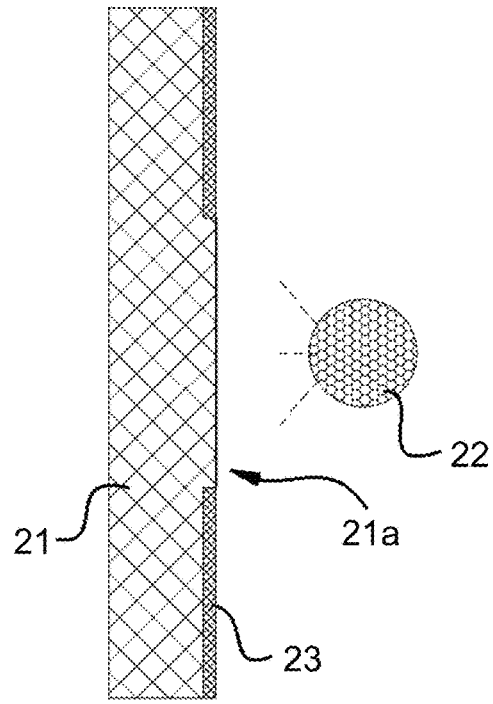
FIG. 2.10
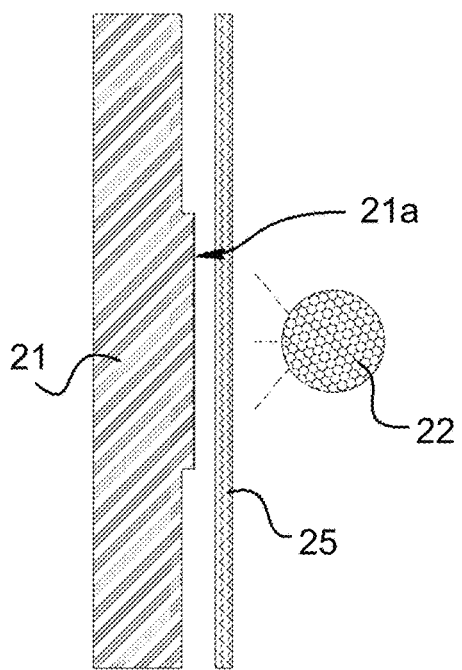
FIG. 2.11
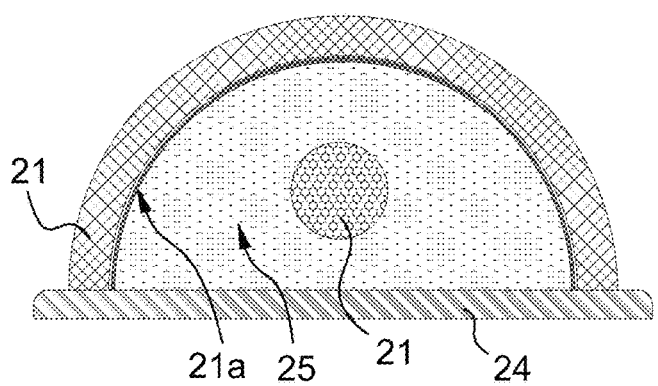
FIG. 2.12

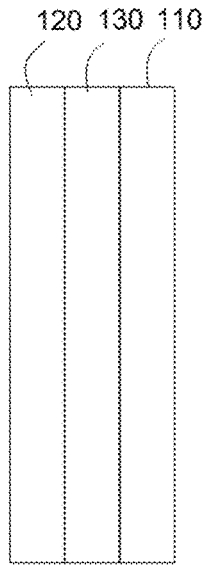
FIG. 3.1
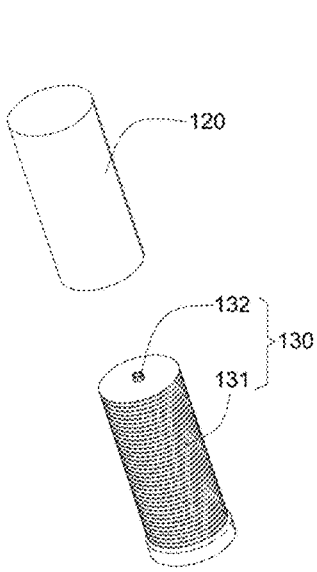
FIG. 3.2
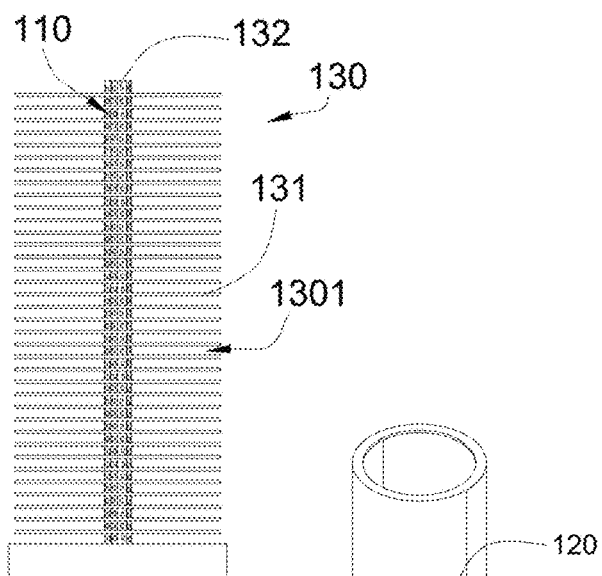
FIG. 3.3
FIG. 3.4
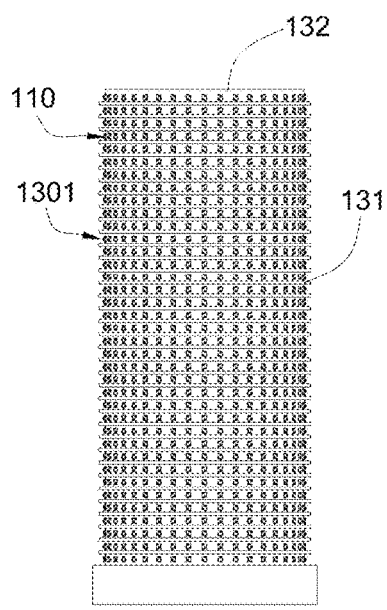
FIG. 3.5
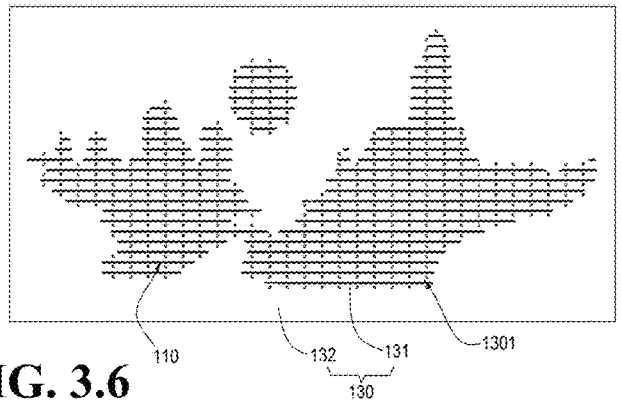
FIG. 3.6

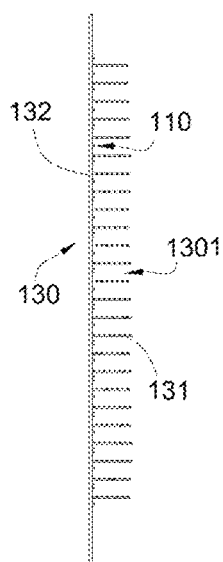
FIG. 3.7
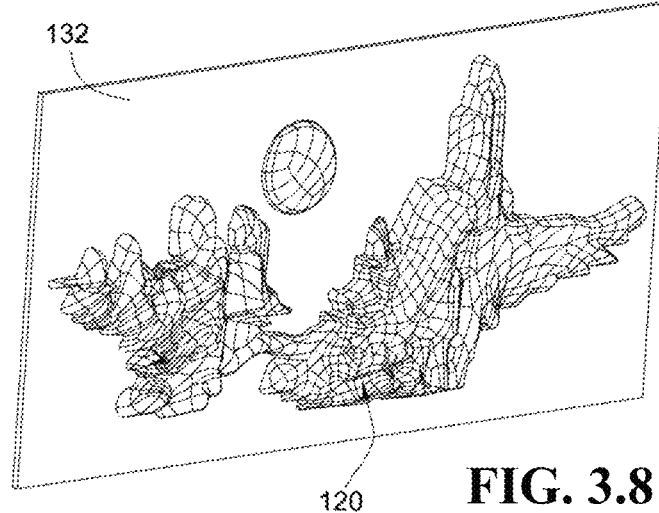
FIG. 3.8
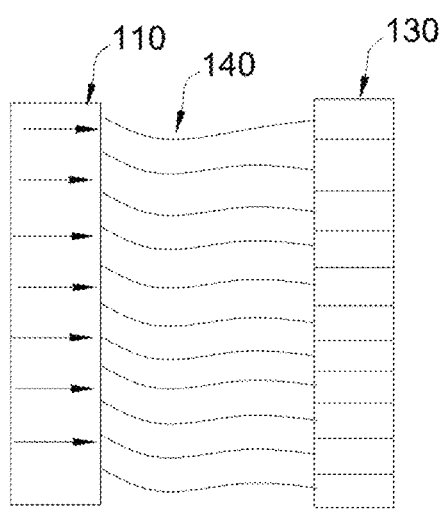
FIG. 3.9
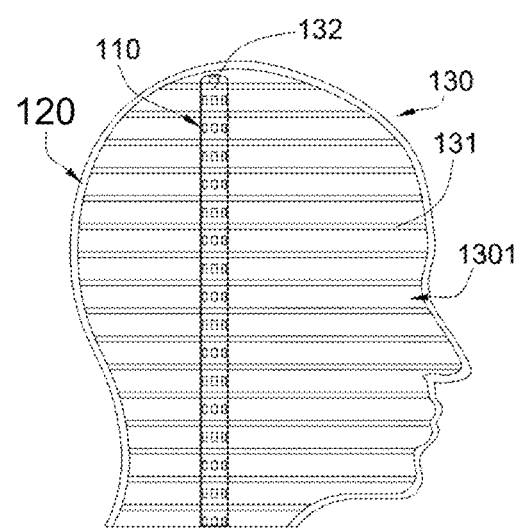
FIG. 3.10
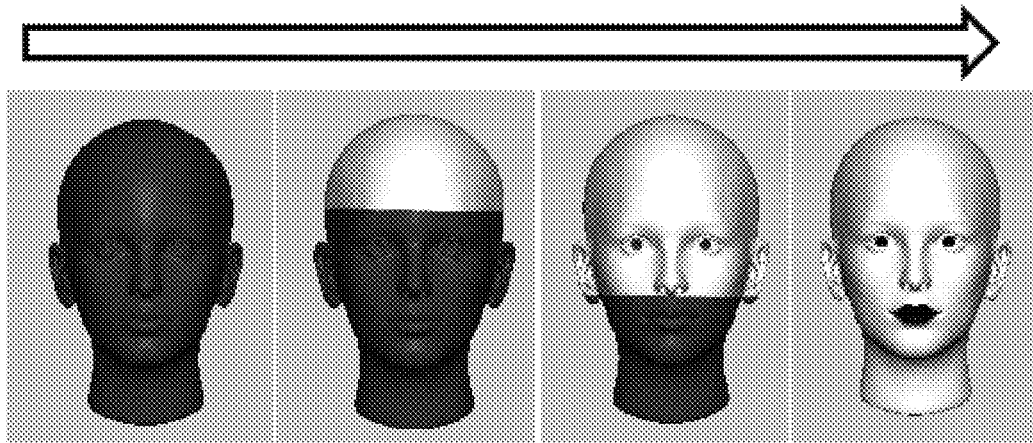
FIG. 3.11A  FIG. 3.11B  FIG. 3.11C  FIG. 3.11D

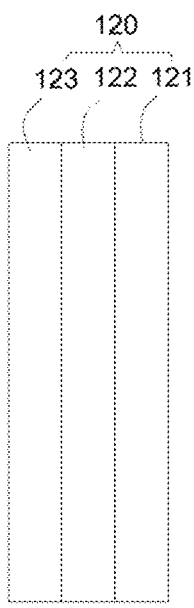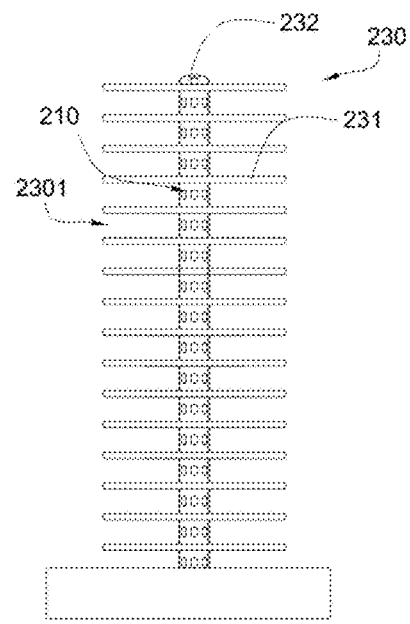
FIG. 3.12  FIG. 3.13
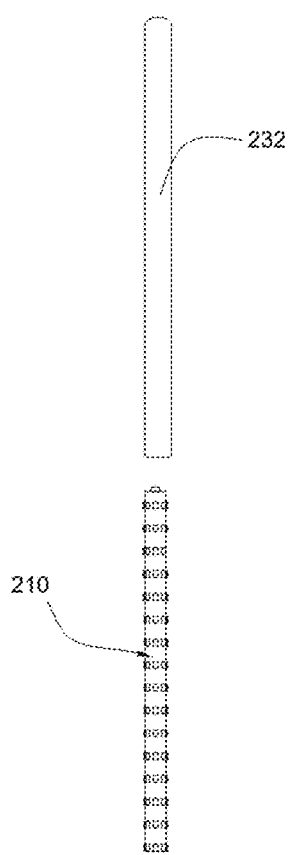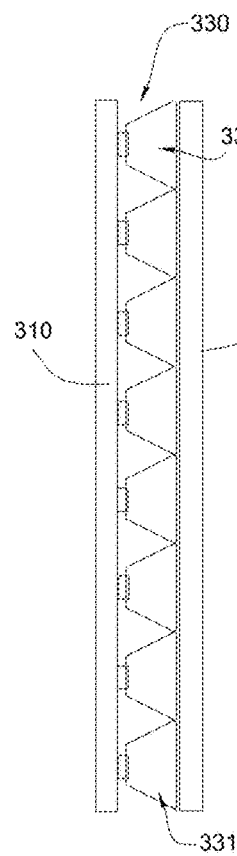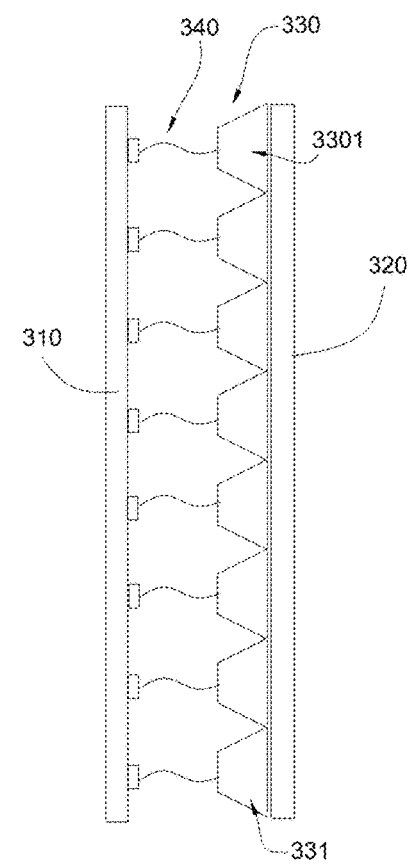
FIG. 3.14  FIG. 3.15  FIG. 3.16

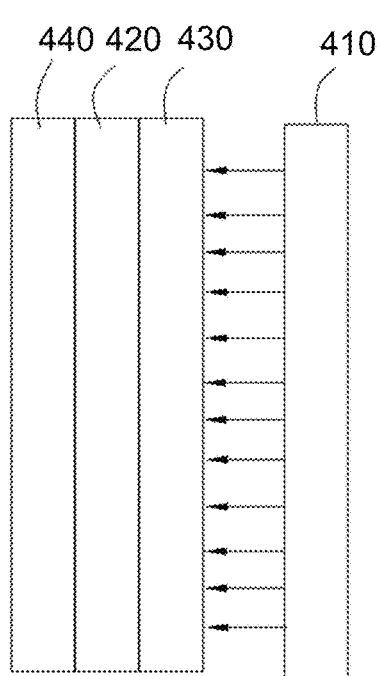
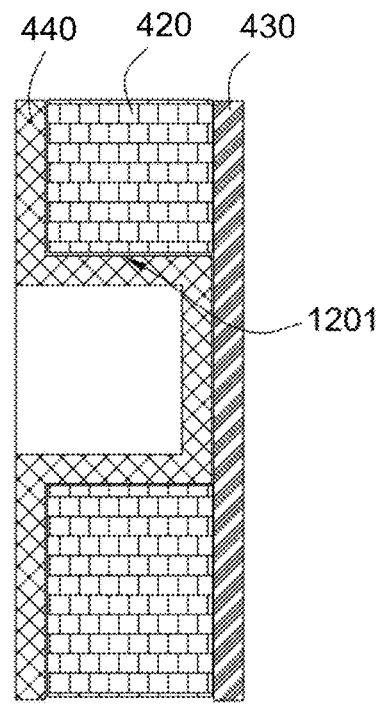
FIG. 4.1  FIG. 4.2
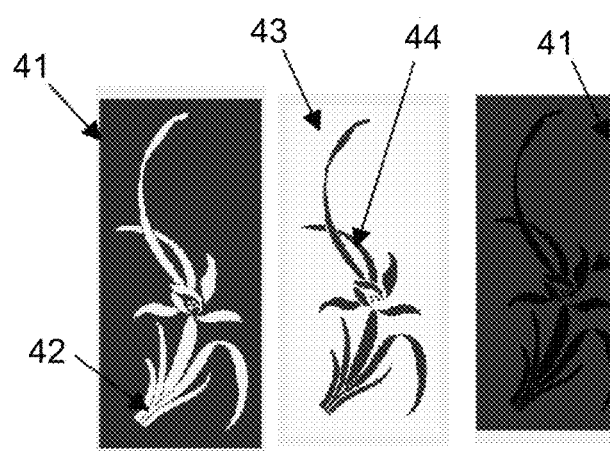
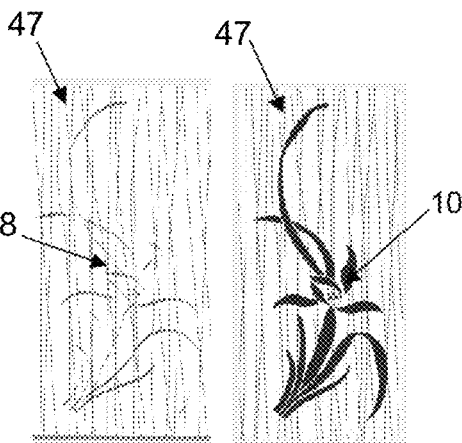
FIG. 4.3A  FIG. 4.3B  FIG. 4.3C    FIG. 4.3D  FIG. 4.3E

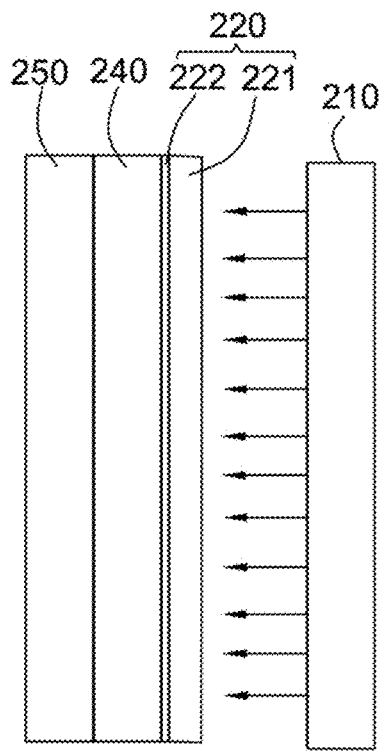
FIG. 4.4
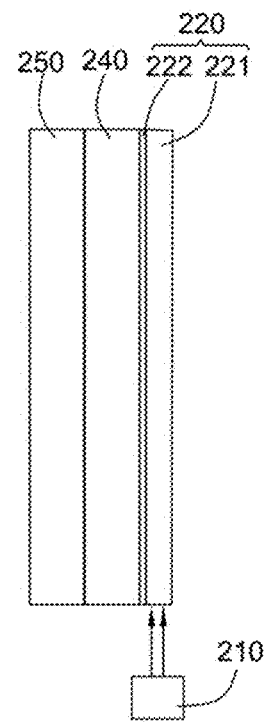
FIG. 4.5
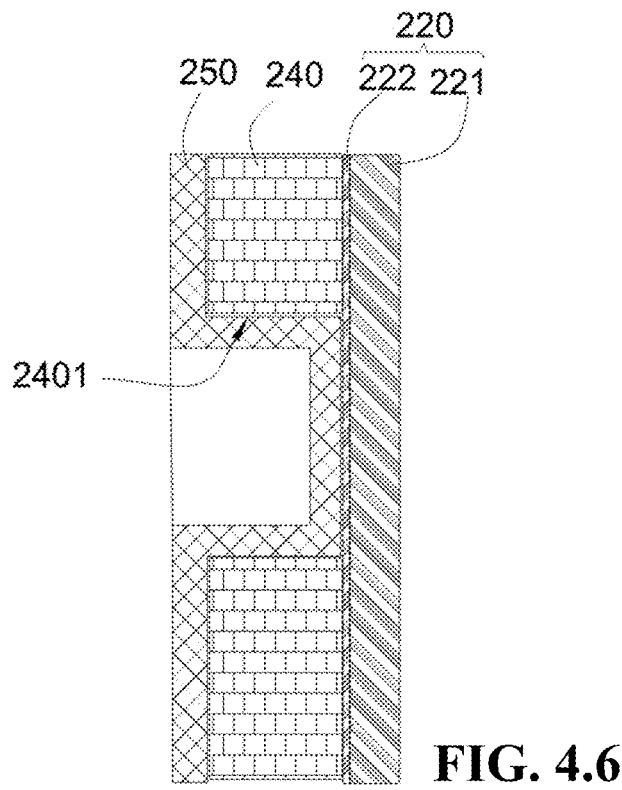
FIG. 4.6

DEVICE WITH BACKLIT COLORED DISPLAY AND METHOD OF MANUFACTURE

CROSS-REFERENCE TO RELATED APPLICATIONS

This application is a continuation-in-part application of PCT/CN2021/125958, filed 25 Oct. 2021, which claims the benefit of and priority to Chinese patent application No. 202022428459.5, filed 26 Oct. 2020, the entire contents of each of which are incorporated herein by reference.

This application also claims the benefit of and priority to each one of Chinese patent application Nos. 202221070638.9, 202222491588.8, 202222570333.0, and 202223168465.7, filed 3 May 2022, 19 Sep. 2022, 27 Sep. 2022, and 28 Nov. 2022, respectively, the entire contents of each one of which are incorporated herein by reference.

FIELD

The present invention relates generally to devices displaying colored images with backlighting, and particularly to devices displaying images that are dynamically colored by backlighting.

BACKGROUND

A known backlit ornament includes a light-transmissive plate with a pattern thereon and a light source for backlighting the light-transmissive plate. When no light is emitted by the light source, the pattern is visible to a viewer without backlighting. When the light source is turned on and emits light, the pattern is illuminated by backlighting. Pattern exhibits the same color(s) both when it is backlit and when it is not backlit.

SUMMARY

The present disclosure discloses a number of embodiments of different devices and methods.

In a first aspect, there is provided a backlit device for displaying an image having variable colors, comprising a substrate; a light-transmissive coloring layer painted or laminated on the substrate, the coloring layer comprising a plurality of colorants of different colors and having a rear side in contact with the substrate and a varnished front side; a display layer comprising a silvering material directly plated on the varnished front side of the coloring layer, the display layer comprising a display pattern forming a visible displayed image, the silvering material comprising a metal, a metalloid, or an oxide thereof to form a one-way-mirror; and an illuminator configured and positioned to illuminate the coloring layer from the rear side of the coloring layer, wherein (i) when the coloring layer is unilluminated by the illuminator, the unilluminated coloring layer is hidden behind the one-way-mirror, and (ii) when the coloring layer is illuminated by the illuminator, the illuminated coloring layer visibly colorizes the displayed image through the one-way-mirror.

The device described in the preceding paragraph may include one or more of the following features. The silvering material may be electroplated, vacuum-plated, or spray-plated on the varnished front side of the coloring layer. The silvering material may comprise aluminum, titanium, chromium, silver, titanium dioxide ($TiO_2$), or silica. The varnished front side of the coloring layer may comprise a varnish coating, and the varnish coating may comprise an acrylic resin, a polyurethane, polycarbonate, or polyvinyl acetate. The varnish coating may be transparent. The varnish coating may alternatively be translucent and comprise a white pigment. The substrate may be light-transmissive and the illuminator may be attached to the substrate. The illuminator may comprise a light source positioned at an edge of the substrate and a light guide for guiding light emitted from the light source to the coloring layer through the substrate. The illuminator may comprise a light source embedded or enclosed in the substrate. The display pattern of the display layer may comprise a three-dimensional structure. The substrate may comprise a three-dimensional structure, the coloring layer may be laminated on the three-dimensional structure, and the display layer may be of a uniform thickness such that the displayed image of display layer exhibits the three-dimensional structure. The coloring layer may have a three-dimensional structure, and the display layer may be of a uniform thickness such that the displayed image exhibits the three-dimensional structure. The illuminator may comprise a plurality of light sources. The substrate may comprise a glass, plastic, acrylic polymer, or cured light-transmissive resin. The substrate may comprise a masking layer, the masking layer comprising one or more openings allowing light emitted from the illuminator to pass therethrough and illuminate one or more corresponding selected portions of the coloring layer. The display layer may comprise a spacing layer between the silvering material and the display pattern. The display layer may comprise a light-transmissive coating covering the display pattern.

In another aspect, there is provided a method of forming a device for displaying an image with variable colors. The method comprises painting or laminating a light-transmissive coloring layer on a substrate, the coloring layer comprising a plurality of colorants of different colors and having a rear side in contact with the substrate and a front side; applying a varnish to the coloring layer to form a varnish coating on the front side of the coloring layer; plating a silvering material on the varnish coating to form a one-way-mirror; forming a display pattern on the silvering material to provide a visible displayed image; and attaching to the substrate an illuminator positioned and configured to illuminate the coloring layer from the rear side of the coloring layer; wherein the silvering layer has a thickness such that (i) when the coloring layer is unilluminated by the illuminator, the unilluminated coloring layer is hidden behind the one-way-mirror, and (ii) when the coloring layer is illuminated by the illuminator, the illuminated coloring layer visibly colorizes the displayed image through the one-way-mirror. The silvering material may be plated on the varnish coating by electroplating, vacuum-plating, or spray-plating. The silvering material may comprise aluminum, titanium, chromium, silver, titanium dioxide ($TiO_2$), or silica. The varnish coating may comprise an acrylic resin, a polyurethane, polycarbonate, or polyvinyl acetate.

Other aspects, features, and embodiments of the present disclosure will become apparent to those of ordinary skill in the art upon review of the following description of specific embodiments in conjunction with the accompanying figures.

BRIEF DESCRIPTION OF DRAWINGS

In the figures, which illustrate, by way of example only, embodiments of the present disclosure:

FIGS. 1.1 to 1.18 are schematic views of different devices, according to different embodiments of the present disclosure;

FIGS. 2.1 to 2.12 are schematic views of further devices, according to different embodiments of the present disclosure;

FIGS. 3.1 to is a schematic view of a device according to an embodiment of the present disclosure;

FIG. 3.2 is a schematic exploded view of an example embodiment of the device of FIG. 3.1;

FIG. 3.3 is a schematic side view of the mounting frame shown in FIG. 3.2;

FIG. 3.4 is a schematic exploded view of another example embodiment of the device of FIG. 3.1;

FIG. 3.5 is a schematic side view of the mounting frame shown in FIG. 3.4;

FIG. 3.6 is a schematic view of another device, according to an embodiment of the present disclosure;

FIG. 3.7 is a schematic side view of the mounting frame in the device of FIG. 3.6;

FIG. 3.8 is a schematic perspective view of the decorative layer in the device of FIG. 3.6, in isolation;

FIG. 3.9 is a schematic side view of a device, according to an embodiment of the present disclosure;

FIG. 3.10 is a schematic side view of another device, according to an embodiment of the present disclosure;

FIGS. 3.11A to 3.11D are schematic views of a front side of the device of FIG. 3.10, showing the animation effects of sequential backlight, according to an embodiment of the present disclosure;

FIG. 3.12 is a schematic side view of another device, according to an embodiment of the present disclosure;

FIG. 3.13 is a schematic side view of another device, according to an embodiment of the present disclosure;

FIG. 3.14 is a schematic exploded view of the mounting sleeve and the light source column in the device of FIG. 3.13;

FIGS. 3.15 and 3.16 are schematic side views of different devices according to different embodiments of the present disclosure;

FIG. 4.1 is a schematic side view of a device with a front sunken relief, in accordance with an embodiment of the present disclosure;

FIG. 4.2 is a schematic side cross-sectional view of a front portion of the device of FIG. 4.1;

FIGS. 4.3A to 4.3E are schematic front views of different layers of a device, according to an embodiment of the present disclosure; and FIGS. 4.4 to 4.6 are schematic views of different devices, according to different embodiments of the present disclosure.

DETAILED DESCRIPTION

In an embodiment of the present disclosure, a device for displaying an image having variable colors comprises a substrate; a light-transmissive coloring layer painted or laminated on the substrate, the coloring layer comprising a plurality of colorants of different colors and having a rear side in contact with the substrate and a varnished front side; a display layer comprising a silvering material directly plated on the varnished front side of the coloring layer, the display layer comprising a display pattern forming a visible displayed image, the silvering material comprising a metal, a metalloid, or an oxide thereof to form a one-way-mirror; an illuminator configured and positioned to illuminate the coloring layer from the rear side of the coloring layer; wherein (i) when the coloring layer is unilluminated by the illuminator, the unilluminated coloring layer is hidden behind the one-way-mirror, and (ii) when the coloring layer is illuminated by the illuminator, the illuminated coloring layer visibly colorizes the displayed image through the one-way-mirror. The silvering material may be electro-plated, vacuum-plated, or spray-plated on the varnished front side of the coloring layer, and may comprise aluminum, titanium, chromium, silver, titanium dioxide ($TiO_2$), or silica. The varnished front side of the coloring layer may comprise a varnish coating, which may be formed of an acrylic resin, a polyurethane, polycarbonate, or polyvinyl acetate. The varnish coating may be transparent, or may be translucent and comprise a white pigment. The substrate may be light-transmissive, such as transparent or translucent. The illuminator may be attached to the substrate. The illuminator may comprise a light source positioned at an edge of the substrate and a light guide for guiding light emitted from the light source to the coloring layer through the substrate. The illuminator may comprise a light source embedded or enclosed in the substrate. The display pattern of the display layer may comprise a three-dimensional structure. For example, the substrate may comprise a three-dimensional structure, and the coloring layer is laminated on the three-dimensional structure and the display layer is of a uniform thickness, such that the displayed image of display layer exhibits the three-dimensional structure. Alternatively, the coloring layer may have a three-dimensional structure and the display layer is of a uniform thickness such that the displayed image exhibits the three-dimensional structure. The illuminator may comprise a plurality of light sources. The substrate may comprise a glass, plastic, acrylic polymer, or cured light-transmissive resin. The acrylic polymer may be poly (methyl methacrylate) (PMMA). The substrate may comprise a masking layer. The masking layer may comprise one or more openings allowing light emitted from the illuminator to pass therethrough and illuminate one or more corresponding selected portions of the coloring layer. The display layer may comprise a spacing layer between the silvering material and the display pattern. The display layer may comprise a light-transmissive coating covering the display pattern.

Further embodiments relate to a method of forming a device as described above. The method may comprise providing a substrate as described above, painting or laminating the light-transmissive coloring layer on the substrate, applying a varnish to the coloring layer to form the varnish coating on the front side of the coloring layer, plating the silvering material on the varnish coating to form a one-way-mirror, forming the display pattern on the silvering material to provide the visible displayed image, and attaching to the substrate an illuminator positioned and configured to illuminate the coloring layer from the rear side of the coloring layer. The plating may comprise electroplating, vacuum-plating, or spray-plating.

In a particular embodiment, an example light-transmissive ornament 100 is shown in FIG. 1.1, which comprises a color pattern layer 101, a decorative pattern layer 102 and a light source 103. The color pattern layer 101 and the decorative pattern layer 102 are attached to each other and light transmissive. A color pattern is formed in the color pattern layer 101, and a decorative pattern is formed in the decorative pattern layer 102. The decorative pattern and the color pattern correspond to each other. The light source 103 has a light-emitting end positioned adjacent to the color pattern layer 101. When the light source 103 emits light, the emitted light illuminates the color pattern layer 101 such that the colors of the color pattern colorize the decorative pattern to provide visible colorized image of the decorative pattern. When no light is emitted by the light source 103, the decorative pattern hides or blocks the color pattern. When no light is emitted by the light source 103, the light-emitting ornament exhibits the decorative pattern. When the light source 103 emits light, the light sequentially passes through the color pattern layer 101 and the decorative pattern layer 102, such that the colors of the color pattern colorize the decorative pattern, the entire ornament exhibits a colored graphic image, and the decorative pattern is colored by light emitted by the light source 103.

It can be understood that the color pattern layer 101 may be a light-transmissive coating layer formed by painting a color coating, glass having a color pattern, a color light-transmissive film, or the like. The color(s) of the color pattern may be a combination of one or more of red, orange, yellow, green, cyan, blue, and purple.

The decorative pattern can completely or at least partially correspond to the color pattern. When the decorative pattern only partially corresponds to the color pattern, a new color pattern may be formed in the decorative pattern layer 102 while the light source 103 is emitting light; when the decorative pattern corresponds to the color pattern, the colors of the color pattern are reflected on the decorative pattern while the light source 103 is emitting light, so the decorative pattern is colorized.

In an embodiment, the decorative pattern of the decorative pattern layer 102 is preferably a black-and-white, or plain-colored, pattern. In this embodiment, the decorative pattern of the decorative pattern layer 102 and the color pattern of the color pattern layer 101 are the same pattern in shape and size, and they only differ in their colors. In other embodiments, the decorative pattern may have colors other than black and while.

The color pattern and the decorative pattern may have a planar or three-dimensional structure.

The light source 103 may be a light-emitting diode (LED) bulb, an LED strip, an LED bar, or the like, or may include a light bulb and a light guide. The LED strip may be flexible or rigid. The light guide may be a light guide strip or a light guide panel. When the light source 103 is a light bulb, the light source 103 is arranged right opposite the color pattern layer 101. In the case that the light source 103 is a combination of a light bulb and a light guide bar, light emitted by the light source 103 is transmitted to the color pattern layer 101 by means of the light guide bar. The light source 103 may be arranged at any position according to requirements, and there is no fixed positional relationship between the light source 103 and the color pattern layer 101, as long as a light emergent end of the light source 103 is arranged opposite the color pattern layer 101. The light bulbs may include LED lamp beads, LED beads, or light bulb beads.

In an embodiment, the light source 103 has an adjustable brightness. Adjusting the brightness of the light source 103 can change the brightness of the color pattern mapped on the decorative pattern, and thus the color tone of the decorative pattern. For example, the colors of the decorative pattern can be gradually changed by adjusting the brightness of the light source 103 over a period of time.

In an embodiment, a plurality of light sources 103 are provided. Each of the light sources 103 may illuminate a respective region on the color pattern layer 101. The light sources 103 may illuminate the color pattern layer 101 together or separately. When the light sources 103 illuminate different and separate regions separately, a plurality of separate luminous regions are formed on the decorative pattern layer 102. By providing the plurality of light sources 103 and enabling the plurality of light sources 103 to emit light separately or together, the emitted light may illuminate the entire color pattern layer 101, and thus the entire decorative pattern layer 102 through the color pattern layer 101 and the light-transmissive layer 105; or selectively control the illuminated regions of the color pattern layer 101, which are reflected on the colorized regions on the decorative pattern layer 102. Thus, the colorized pattern exhibited by the decorative pattern may be controlled and changed according to the user's needs.

In an embodiment, the light-transmissive ornament further comprises a light-transmissive supporting layer 104. The supporting layer 104 is arranged between the color pattern layer 101 and the decorative pattern layer 102, or on the side of the color pattern layer 101 away from the decorative pattern layer 102, or on the side of the decorative pattern layer 102 away from the color pattern layer 101. The supporting layer 104 provides support for the entire light-transmissive ornament. The supporting layer 104 does not prevent transmission of light therethrough.

As illustrated in FIGS. 1.1, 1.2, 1.16 and 1.17, the light source 103 may be positioned in various configurations in different embodiments.

In an embodiment as illustrated in FIG. 1.1, multiple light sources 103 are positioned on the rear side of the supporting layer 104 (the side away from the color pattern layer 101) and is adjacent to the supporting layer 104.

In embodiments as illustrated in FIGS. 1.2 and 1.17, the light sources 103 are embedded in the supporting layer 104. In this embodiment, the light sources 103 and the supporting layer 104 may be integrally formed.

In an embodiment as illustrated in FIG. 1.16, mounting recesses may be provided in the supporting layer 104 and the light sources 103 are disposed in the mounting recess. This embodiment allows convenient mounting and maintenance of the light sources 103.

The supporting layer 104 provides a substrate for the other layers supported there on, and may include a light-transmissive crystal material, a polyvinyl chloride (PVC) panel, a glass panel, a plastic panel, or the like.

As illustrated in FIGS. 1.5 and 1.6, in an embodiment, the decorative device may have a three-dimensional structure on the displayed surface at the front side. For example, a relief or an intaglio may be provided on the front side of the supporting layer 104 (facing the color pattern layer 101), and the color pattern layer 101, the light-transmissive layer 105 and the decorative pattern layer 102 are respectively laminated or coated on the supporting layer 104. A three-dimensional pattern may be provided on the side of the supporting layer 104 close to the color pattern layer 101, and the three-dimensional pattern exhibits an effect of a relief or an intaglio.

In an embodiment, the supporting layer 104 may be a light-transmissive stone panel, and the color pattern layer 101 and the decorative pattern layer 102 may partially cover the light-transmissive stone panel. In exposed regions of the supporting layer 104 that are not covered by the color pattern layer 101 and the decorative pattern layer 102, an original color of the stone panel may be visible from the front side, regardless of whether the light source 103 is emitting light or not.

In some embodiments, the supporting layer 104, the color pattern layer 101 and the decorative pattern layer 102 are positioned in that order and the light-transmissive ornament further comprises a light-transmissive layer 105, as illustrated in FIGS. 1.1 to 1.11 and 1.13 to 1.17. In various embodiments as illustrated, the layer 105 is arranged between the color pattern layer 101 and the decorative pattern layer 102.

When the light-transmissive layer 105 is not provided, such as illustrated in FIG. 12, the decorative pattern of the decorative pattern layer 102 directly contacts and covers the color pattern of the color pattern layer 101, and the decorative pattern layer 102 needs to be thicker or darker in order to cover and hide the colors on the color pattern layer 101 when the light sources 103 are off. However, a thicker or darker decorative pattern layer 102 also reduces light transmission when the color pattern layer 101 is illuminated by the light sources 103. With an additional light-transmissive layer 105 between the decorative pattern layer 102 and the color pattern layer 101, layer 105 may be conveniently configured to provide a one-way-mirror so that the decorative pattern layer 102 can be made of a thinner or lighter material as compared to the embodiment shown in FIG. 1.12.

The layer 105 may be made of a material having a very high light transmittance, such as thin glass, a plastic film, or a thin acrylic film or panel. The layer 105 may also include a substance having a relatively low light transmittance, such as a light-transmissive, opaque white pigment. When layer 105 has a high light transmittance, the layer 105 itself does not block or hide the color pattern, but can function as a spacer for separating the decorative pattern layer 102 from the color pattern layer 101. When layer 105 has a relatively low light transmittance, it can partially or completely block or hide the color pattern on the color pattern layer 101, and also separate the decorative pattern layer 102 from the color pattern layer 101. In any case, the decorative pattern layer 102 can also further obscure the color pattern on the color pattern layer 101. Since the layer 105 always transmits light, when the light source 103 emits light, the emitted light passes through the color pattern layer 101 to form colored light which illuminates the decorative pattern on the decorative pattern layer 102. The higher the light transmittance of the light-transmissive layer 105 is, or the brighter the light source 103 is, the brighter the decorative pattern is. When no light is emitted by the light source 103, the decorative pattern layer 102 alone or together with the light-transmissive layer 105 may block the color pattern.

As shown in FIGS. 1.1, 1.2, 1.6, 1.8, 1.10 and 1.11, in various embodiments, the supporting layer 104, color pattern layer 101, layer 105, and decorative pattern layer 102 may sequentially correspond to one another.

As shown in FIGS. 1.14 and 1.15, in some embodiments, the supporting layer 104 may form a light guide having a light incident end located at an edge of the supporting layer 104 and a light emitting surface adjacent to the color pattern layer 101. The light source 103 is located and faces the light incident end of the light guide. The light source 103 may be mounted to the edge of the supporting layer 104, which allows convenient mounting and maintenance of the light source 3.

It can be understood that the light guide in the supporting layer 104 may be a light guide panel or a light guide bar, or the like.

In the embodiment illustrated in FIG. 1.15, a light guide panel 104 is sandwiched between the color pattern layer 101 and reflective layer 106. The light guide panel 104 can emit lights at both sides, i.e., the side facing the layer 101 and the side facing the layer 106. The reflecting layer 106 is in contact with light guide panel 104 and reflects light towards the color pattern layer 101, thus reducing loss of light, as compared to the embodiment illustrated in FIG. 1.14.

FIG. 1.3 illustrates an embodiment where the decorative device has a tubular cross-section and the light-transmissive supporting layer 104 defines a cavity for accommodating the light source 103. The color pattern layer 101, light-transmissive layer 105 and decorative pattern layer 102 are sequentially positioned on an outer wall of the supporting layer 104. As the light source 103 is disposed in the accommodation cavity of the supporting layer 104, the light-transmissive ornament may form a lampshade or a luminous and decorative column or pillar, or the like.

In various embodiments, the supporting layer 104 may have a plate or panel shape, a spherical shape, a prismatic shape, a figurative shape such as shaped like a Buddha's head, fruit, or the like. In different embodiments, the supporting layer 104 may have other shapes.

As illustrated in FIGS. 1.2, 1.4, 1.6, 1.8, 1.10 and 1.11, in some embodiments, at least one mounting recess may be provided on the rear side of the supporting layer 104, and one or more light sources 103 may be positioned in the at least one mounting recess.

The mounting recess can house and protect the light source 103 from exposure to the environment, so that the light source 103 can be effectively protected and prevented from being damaged.

As illustrated in FIG. 1.7, a three-dimensional structure such as a relief or an intaglio may be provided on the front side of the layer 105. The decorative pattern layer 102 is deposited on and in contact with the layer 105 so that a three-dimensional pattern exhibiting an effect of a relief or an intaglio is visible on the decorative pattern layer 102.

In an embodiment, the layer 105 may be relatively thin, such as having a thickness less than 1 mm, so that the decorative pattern may exhibit a better color effect when the color pattern layer 101 is illuminated by the light source 103.

In an embodiment, the layer 105 is white colored. A white-colored layer 105 can better block/hide the color pattern on the color pattern layer 101. In this case, the decorative pattern layer 102 may have a lighter color or be more transparent and the color pattern layer 101 is still invisible when the light source 103 is off.

In some embodiments, the layer 105 completely covers the color pattern on the color pattern layer so that the color pattern is completed concealed or obscured from view when the light source 103 is off.

In some embodiments, the decorative pattern on the decorative layer 102 may only correspond to one or more parts of the color pattern on the color pattern layer 101. When the light source 103 is on, both the color pattern and the colored decorative pattern are visible and exhibited on the decorative pattern layer 101. In this case, when the light source 103 is turned on and emits light, a new pattern is exhibited on the decorative pattern layer 102, which is different from the original decorative pattern visible when the light source 103 is off. For example, when the light source 103 is off, three horses may be displayed on the decorative pattern layer 102, but when the light source 103 is turned on, five horses may be visible on the color pattern layer 101, three of which are the original horses of the decorative pattern and two of which were from the color pattern of the color pattern layer 101. The latter two horses are blocked and concealed from view by the layer 105 when the light source 103 is off. This way, the visible displayed image on the decorative pattern layer 102 can be changed by turning on and off the light source 103.

As illustrated in FIG. 1.4, the light-transmissive ornament may further comprise a mask or mask layer 107 positioned between the light source 103 and the color pattern layer 101. The mask layer 107 has one or more openings positioned to corresponding to the color pattern to allow light from the light source 103 to pass therethrough to illuminate the color pattern. The mask layer 107 blocks light from transmitting therethrough in other areas of the mask layer 107.

The mask layer 107 may be positioned between the color pattern layer 101 and the supporting layer 104, or between the supporting layer 104 and the light source 103. In the embodiment illustrated in FIG. 1.4, the mask layer 107 is in a mounting recess of the supporting layer 104, and is positioned between an inner wall of the mounting recess and the light source 103.

As, when the light source 103 is on, the decorative pattern of the decorative pattern layer 102 is only illuminated through the opening in the mask layer 107, a clear outline of the colorized decorative pattern can be obtained.

As illustrated in FIGS. 1.8, 1.9, 1.10 and 1.11, the light-transmissive ornament may further comprise a frame 108, and the supporting layer 104 is mounted in the frame 108 and attached to an inner wall of the frame 108.

With the frame 108, the decorative ornament may be conveniently hung on, or affixed to, a wall by means of the frame 108.

The frame 108 may have a rectangular shape, a triangular shape, a circular shape, a polygon shape, or the like, or have other shapes.

Some or all of the layers 101, 102 and 105 may be enclosed within the frame 108. The layers 101, 105, and 102 may alternatively protrude outside of the frame 108.

As illustrated in FIGS. 1.10 and 1.11, the light-transmissive ornament may further comprise a back plate 109. The back plate 109 is arranged in the frame 108 and attached to the inner wall of the frame 108, and is at the rear side of the supporting layer 104, such that dirt and dust are prevented from contacting the rear side of the supporting layer 104 away and interfering with transmission of light emitted from the light source 103.

When an accommodation recess for accommodating the light source 103 is provided on the supporting layer 104, the back plate 109 is in contact with the supporting layer 104. In the case that no accommodation recess is provided on the light-transmissive supporting layer 104, the back plate 109 is spaced apart from the supporting layer 104, and the light source 103 is positioned between the back plate 109 and the light-transmissive supporting layer 104.

As illustrated in FIG. 1.11, a light-reflective layer 112 may also be provided on the rear side of the back plate 109, to reflect light from the light source 103 towards the color pattern layer 101 and to reduce light loss due to absorption or deflection.

In an embodiment as illustrated in FIG. 1.13, a light homogenization layer 111 is provided between the light source 103 and the supporting layer 104. By the light homogenization layer 111 homogenizes the light emitted by the light source 103 so that the brightness of the colorized display image exhibited by the decorative pattern layer 102 is more uniform, and undesirable bright spots on the decorative pattern layer 102 can be avoided.

The light homogenization layer 111 may be a light homogenization panel or optical diffuser panel, a ground or frosted glass, or a PVC panel capable of homogenizing light.

In an embodiment, the light-transmissive ornament may be produced in a process as follows.

In step I, a color pattern is printed on a light-transmissive supporting layer 104 to form the color pattern layer 101.

In step II, the color pattern is coated with light-transmissive glue, to form a light-transmissive layer 105 after the light-transmissive glue is cured.

In step III, a decorative pattern is printed on the light-transmissive layer 105 to form a decorative pattern layer 102.

The color pattern layer 101, the light-transmissive layer 105 and the decorative pattern layer 102 are sequentially printed/manually drawn on the light-transmissive supporting layer 104. A method for printing a pattern on a light-transmissive layer 105 is ultraviolet (UV) printing, but the methods for printing a pattern on a light-transmissive layer 105 are not limited thereto. For example, screen printing such as silk-screen printing may also be suitable in some cases.

The light-transmissive glue may be a polyurethane adhesive, or a UV curable adhesive. In an embodiment, the light-transmissive glue is a UV curable adhesive, and the color pattern is coated with the light-transmissive glue through UV printing. In other embodiments, other types of light-transmissive glues may be used.

The color pattern, the light-transmissive layer and the decorative pattern may be printed by a printer synchronously. The patterns may be individually customized or processed in large quantities, and preselect patterns may be accurately drawn.

When the light source 103 is off, the decorative pattern of the decorative pattern layer 102 blocks the color pattern, such that the light-emitting ornament exhibits the decorative pattern. When the light source 103 is on and emits light, the light sequentially passes through the light-transmissive supporting layer 104, the color pattern layer 101, the light-transmissive layer 105 and the decorative pattern layer 102, such that the colors of the color pattern are displayed on the decorative pattern. The entire ornament exhibits colored graphics, and the decorative pattern is colorized by light through the color pattern layer 101 emitted by the light source 103.

For example, in a specific embodiment the light-transmissive supporting layer 104 may have a three-dimensional structure, which may resemble, for instance, a human face as illustrated in FIGS. 3.10 and 3.11A-3.11D. The color pattern on color pattern layer 101 may include black eyebrows and red lips at positions corresponding to the eyes and lips on the face of the 3D structure. The decorative pattern 102 may be printed and include marble veining and a figure resembling a human face that corresponds to the 3D face on the supporting layer 104. When the light source 103 is off, the ornament exhibits a relief with marble veining. However, when the light source 103 is on and emits light, the ornament exhibits a colored 3D face image with black eyebrows and red lips.

The shape and the color of the decorative pattern may be set according to user requirements. If the decorative pattern is thick and dark, the decorative pattern may directly cover the color pattern correspondingly, because the thick and dark pattern has a good effect of blocking the color pattern, and can block the color pattern. Only when the light source 103 emits light, the color is exhibited on the decorative pattern.

When the decorative pattern of the decorative pattern layer 102 directly covers the color pattern of the color pattern layer 101, the decorative pattern layer 102 is required to be thicker or darker to cover the color of the color pattern. However, the decorative pattern layer 102 that is thicker or darker is not conducive to light transmission. In the present application, compared with a method of directly covering a color pattern by a decorative pattern and arranging a transparent light-transmissive layer 105 between the decorative pattern and the color pattern, the method of arranging a light-transmissive, opaque light-transmissive layer 105 between the color pattern and the decorative pattern can make the color of the decorative pattern lighter, without the need for a thicker or darker decorative pattern.

In an embodiment, a light-transmissive decoration comprises a decorative layer comprises a supporting layer, a pattern layer, a concealing layer and a decorative layer which are sequentially arranged from inside to outside, wherein the pattern layer, the concealing layer and the decorative layer are sequentially attached to the outer side of the supporting layer; the pattern layer is provided with a colorful pattern, the pattern layer and the hidden layer both have light transmission, the decorative layer is made of transparent material, and the hidden layer can be seen through the decorative layer; the light source is arranged on the inner side of the supporting layer, when the light source emits light, light rays penetrate through the supporting layer to irradiate the pattern layer, and the color pattern of the pattern layer is enabled to be displayed on the decorative layer on the outermost side through the concealing layer; when the light source does not emit light, the concealing layer conceals the pattern layer so that the color pattern is not visible.

For example, in the embodiments illustrated in FIGS. 1.1 and 1.3, the decorative layer 102 may be transparent, the layer 105 may function as a concealing or obscuring layer. The supporting layer 104 may function as a casing or a substrate. In such an arrangement, the layer 105 is visible through the decorative layer 102. The color pattern layer is protected and the device can provide more colorful and dynamic decorating effects. The color pattern layer 101 may be formed by inkjet printing, manual drawing, or transfer printing. The concealing layer 105 has relatively low light transmittance or is semi-light-transmissive, and is used for hiding the color pattern layer 101. In this embodiment, the hidden layer 101 may be formed by inkjet printing, hand painting, spray painting, transfer printing, electroplating, or baked coating.

Optionally, a light-transmitting layer may be formed by curing light-transmitting adhesive resin disposed between the color pattern layer 101 and the concealing layer 105. For example, the adhesive resin may be a polyurethane (PU) resin, or ultraviolet (UV) cured adhesive resin. When a UV cured resin is used, the resin may be coated on the color pattern layer 101 by UV printing.

The decoration layer 102 may be transparent and may be formed by spraying, painting, or applying and curing a transparent resin on the layer 105.

Optionally, the decorative layer 102 may be doped with color-mixing pigments or decorative particles to form a colored transparent decorative layer 102. Suitable decorative layer or particles may include colored particles, aluminum foil, or reflective particles. The decorative layer 102 may also be transparent and have a colored pattern, and layer 105 may provide a background for the decorative layer 102.

In order to obtain a richer display effect, the color patterns of the color pattern layer 101 and the color patterns of the decoration layer 102 may have different color patterns. When the decoration layer 102 is backlit, the two color patterns are effectively superposed, and the light-transmitting device displays the superposed color patterns. When the backlighting is off, only the color pattern on the decoration layer 102 is visible to the viewer.

As an example, the color pattern of the layer 101 may be a horse in a purplish red color, and the color pattern of the layer 102 may be a horse in a gray color. The backlighting lighting points may be positioned corresponding to different parts of the displayed horse. For instance, different LED bulbs may be positioned directly behind the horse head, the horse tail, the horse body, and the horse legs, respectively. A controller may be used to control the LED light source 103 and to program the lighting sequence so that the displayed image is sequentially lighted and colorized according to a preselected sequence, to provide a dynamic color rendering effect.

As another example, the color pattern of the layer 101 may show a landscape image, and the color pattern of the layer 102 may show a red horse. Different LED bulbs may be positioned behind different elements or portions of the landscape, such as rivers, roads, flowers, plants, or trees. When the device is not backlit, only the horse is visible. When the device is backlit, some or all of the landscape may become visible and be superimposed with the horse image. The controller may control the backlighting sequence so that different display effects can be obtained.

In a further embodiment, the layer 102 may show a two-dimensional picture, or may be a decorative screen or panel.

As illustrated in FIG. 1.18, in another embodiment, a decorative device may include a pattern layer 101' with a 3D pattern, a concealing layer 105', and a decorative layer 102' with a flat front side (the right hand side as viewed in FIG. 1.18), which are ordered in sequence away from the light sources 103'. The pattern layer 101' may be similarly formed as color pattern layer 101, and the concealing layer 105' may be similarly formed as layer 105 described elsewhere herein. Light sources 103' are similar to light sources 103 described above.

As depicted in FIG. 1.18, an optional light-transmissive layer 107 formed of a cured glue or adhesive resin may be provided between the pattern layer 101' and the concealing layer 105'. Layer 107 may be formed of a PU or UV curable resin, and can be coated or printed on the pattern layer 101' using techniques disclosed herein.

In an embodiment, the decorative layer 102' is transparent and the concealing layer 105' is visible through the decorative layer 102'. The rear (inner) side of the decorative layer 102' includes a three-dimensional (3D) pattern, which may be in the form of an intaglio or relief. The pattern layer 101' and concealing layer 105' are also shaped to conform to the 3D pattern on the decorative layer 102'. The decorative layer 102' in this case may be formed of a transparent glass or acrylic material such as poly (methyl methacrylate) (PMMA).

As depicted in FIG. 1.18, the front side of decorative layer 102' is flat and shows a 2D pattern. However, in other embodiments, the front side of the decorative layer 102' may optionally include a 3D pattern formed by intaglio or relief, so as to provide a transparent 3D pattern, and the concealing layer 105' may function as a background layer for the decorative layer 102'.

The light sources 103 may be LED light sources and a controller (not separately shown) may be used to control the on and off of the light sources 103. For example, the controller may include a single-chip microcomputer or an integrated circuit (IC). As the light sources 103' are positioned behind the pattern layer 101', the light sources 103' can provide backlighting to pattern layer 101' and the decorative layer 102' as described elsewhere herein. The light sources 103' can be controlled to provide dynamic colorizing effects as described elsewhere herein.

To obtain a richer or more lively visual effect, the color pattern of the pattern layer 101' and the 3D pattern on the decoration layer 1021' can be different patterns and may be of different colors. As a result, when the backlighting is on, the image visible from the front side of the decorative layer 102' include two superposed colored patterns.

As examples, the color pattern on layer 101' may a garden flower pattern, and the three-dimensional pattern of the decorative layer 102' may show a sculpture of the flower. The light source 103' can be configured to provide different lighting effects for different parts of the flower and any background image (e.g., bushes, grasses, or the like). For example, the light sources 103' behind different parts may emit lights of different colors or intensities, or both.

In another embodiment, a device includes a decorative structure and a light-emitting assembly positioned relative to the decorative structure to project light on the decorative structure to form a light-emitting structure. The light-emitting structure and the decorative structure are of the same surface shape and exhibit the same visible surface pattern but with different colors.

The decorative structure may be a planar pattern or a three-dimensional pattern, and the decorative structure is made of a transparent material. The decorative structure may be arranged on the surface of the decorative assembly or arranged in the decorative assembly. The color of light emitted by the light-emitting assembly can be changed, so that the color of the light-emitting structure can be changed. The light-emitting assembly may be arranged on the back of the decorative assembly, and when the light-emitting assembly emits light, a light-emitting structure is visible on the front face of the decorative assembly. The light-shielding structure further may include a shielding structure with an opening positioned on a light path between the light-emitting assembly and the decorative structure. The decorative assembly merely shows decorative structure in its natural colors when not backlit, but provides a light-emitting decorative structure with different visual effects when backlit.

In particular, as shown in FIGS. 2.1 to 2.12, an embodiment of a light-emitting device includes a decorative assembly 21 and a light-emitting assembly 22. The decorative assembly 21 is provided with a decorative structure 21a. The light-emitting assembly 22 is provided relative to the decorative assembly 21. The light-emitting assembly 22 can emit light onto the decorative structure 21a, so that a light-emitting structure is formed on the decorative structure 201a, and the light-emitting structure and the decorative structure 21a have the same shape but different colors.

When the light-emitting assembly 22 does not emit light, the decorative assembly 21 shows the decorative structure 21a; and when the light-emitting assembly 22 emits light, the light emitted by the light-emitting assembly 22 travels to the decorative assembly 21 and forms a light-emitting structure on the decorative structure 21a, and the light-emitting structure and the decorative structure 21a have the same shape and different colors.

Since the decorative structure 21a and the light-emitting structure have the same shape but different colors, when the light-emitting assembly 22 does not emit light, the decorative assembly 21 presents the color of the decorative structure 21a itself, and when the light-emitting assembly 22 emits light, the decorative assembly 21 presents a light-emitting structure, which is equivalent to coloring the decorative structure 1a by means of the light-emitting assembly 22. For example, the decorative structure 21a may be a white tree trunk and have white leaves. When the light-emitting assembly 22 emits light, the light of the light-emitting assembly 22 may colorize the tree trunk to brown, and the leaves to green.

The shape of the decoration assembly 21 can be a panel, a block, a cube, a polygonal entity, a ball, a cover, or the like. The appearance of the decoration assembly 21 is not limited.

The decorative structure 21a can be processed and formed by one or more of printing, transfer printing, sunken relief, embossment, hand drawing or laser processing, and the processing mode of the decorative structure 1A is not limited thereto.

The decorative structure 21a is engraved in the interior of the decorative assembly 21 made of glass by means of laser. When the light-emitting assembly 22 does not emit light, the decorative structure 21a is visible, and when the light emitted by the light-emitting assembly 22 acts on the decorative structure 21a in the decorative assembly 21, the light irradiates the decorative structure 21a and is correspondingly colored.

The decorative structure 21a may be arranged on a surface of the decorative assembly 21 or inside the decorative assembly 21.

In an embodiment, the decorative structure 21a is on the inner surface of the decorative assembly 21, and the light-emitting structure is located at the back of the decorative assembly 21. The light-emitting structure is visible to the viewer through the decorative assembly 21 when the light-emitting assembly 22 emits light.

In an embodiment, the decorative structure 21a is formed inside the decorative assembly 21 by laser engraving, and is visible from outside the assembly 21 when the light-emitting assembly 22 emits light.

The light-emitting assembly 22 may be a projection lamp, a projector, a projection device, or an array or matrix of LED bulbs, or the like. The light-emitting assembly 22 may accurately colorize the decorative structure 21a. For example, when the light-emitting assembly 22 does not emit light, the decorative structure 21a may display a frosted face pattern in black or grey color; and when the light-emitting assembly 22 emits light, the eyebrows in the face pattern are still displayed in black, but other parts of the face may be displayed in different colors, such as brown eyes, red lips, and etc. (see, for example, FIGS. 3.11A-3.11D).

In an embodiment, the light emitting assembly 22 may be a projection lamp, which can be used to project a selected image onto the desired locations. The projection lamp has adjustable focus, adjustable projection angle, and adjustable light intensity and colors.

In an embodiment, the color of light emitted by the light-emitting assembly 22 may be varied to change the color of the light-emitting structure. The light-emitting assembly 22 is arranged on the back of the decorative assembly 21. The light-emitting structure is visible on the front side of the decorative assembly 21 when the light-emitting assembly 22 emits light. For example, the decorative structure 21a may display a woman wearing a skirt, and the light-emitting assembly 22 may emit light of different colors so the skirt can be shown in green or yellow, or another color.

As illustrated in FIGS. 2.1 to 2.4, in different embodiments, the decorative structure 21a may be a planar pattern or a three-dimensional pattern. In any event, the decorative structure 21a may be made of a transparent material. A three-dimensional pattern can be a sunken relief pattern, a relief pattern, or the like. The decoration assembly 21 may be made of glass, transparent plastic, transparent resin, transparent quartz crystals, PVC plates, or the like. The decorative assembly 21 can be partially transparent or completely transparent. The decorative structure 21a is visible on the outer wall of the decorative assembly 21, or through the outer wall of the decorative assembly 21.

As illustrated in FIGS. 2.5 to 2.8, in different embodiments, decoration assembly 21 has a groove 21b and the light emitting assembly 22 is disposed in the groove 21b. The decorative assembly 21 and the light-emitting assembly 22 can thus be integrated to form a device such as a lampshade.

A through hole connected to the groove 21b may be formed at the bottom of the decoration assembly 21 to allow the light-emitting assembly 22 be placed in the groove 21b through the through hole. This through hole allows the light-emitting assembly 22 be conveniently replaced or maintained.

In different embodiments, the decorative structure 21a may have a frosted pattern, or a pattern formed by combining an electroplated layer and an overlay layer.

In an embodiment, the decorative structure 21a has a frosted pattern. The frosted pattern is light-transmitting but can hide the parts behind the frosted pattern so they are not visible to the viewer without backlighting. When the decorative structure 21a is backlit by the light-emitting assembly 22, the frosted pattern is relatively detailed and sharp.

The frosted pattern is more suitable when transparent materials are used in the decorative structure 21a.

By comparison, an electroplated layer may be semi-transparent, and may not display a visible pattern or image when not backlit. However, overlaying another layer with a desired color or pattern on the electroplated layer can provide a visible pattern on the electroplated layer. The electroplated layer may be partially exposed and partially covered with the overlay layer, and the exposed portions of the electroplated layer may form a visible pattern, which can be colorized when backlit by the light-emitting assembly 22. This structure is simple to manufacture and can provide improved display effect.

In an embodiment, the decorative structure 21a may be formed on an inner surface of the decorative assembly 21. For example, an overlayed layer or spray painting may be used to cover portions of the inner surface and leave other portions exposed, where the exposed portions form a pattern on the inner surface. The exposed portions can then be plated to form plated layer by an electroplating, vacuum plating, or spray plating technique.

As illustrated in FIGS. 2.1 to 2.3, a frosted pattern 21a is formed on the rear side of the decorative assembly 21, which faces the light-emitting assembly 22. The frosted pattern 21a hides the light-emitting assembly 22 from viewing from the front side of the decorative assembly 21. The light-emitting assembly 22 is not visible when it is off, which may be preferred by some users.

As illustrated in FIG. 2.10, the light-emitting device may further comprise a light-shielding structure 23 (or mask) positioned in the light projection path of the light-emitting assembly 22. The light-shielding structure 23 has an opening for allow the light from light-emitting assembly 22 to pass through and reach the decorative assembly 21. The light shield structure 23 can conveniently block or reduce scattered light and provide a sharper image on the front side of the decorative assembly 21 when it is backlit.

The light-shielding structure 23 may be attached to the light-emitting assembly 22 or the decorative assembly 21, or both.

As illustrated in FIGS. 2.8, 2.9 and 2.12, the light-emitting device may comprise a base 24 attached to the decorative assembly 21. As shown in FIG. 2.9, the base 24 is provided with a groove 24a for housing the light-emitting assembly 22 therein. The base 24 may be positioned at the top, bottom, side edge, or another part of the decorative assembly 21. The base 24 provides support for the device and hides the light emitting assembly 22 so it is not easily visible.

As illustrated in FIGS. 2.11 and 2.12, in some embodiments, a light-transmitting fluid layer 25 may be provided between the decorative assembly 21 and the light-emitting assembly 22. The light-transmitting fluid layer 25 can dynamically refract the light transmitted therethrough, so as to produce a flowing effect on the decorative structure 21a and a sense of dynamic movement. The fluid in fluid layer 25 may be white water vapor, water, smoke, or the like.

Another embodiment relates to a backlit decorative device capable of achieving dynamic colorization. The device incudes a light-emitting unit, a main unit and a partition layer between the light-emitting unit and the main unit. The main unit includes a color pattern layer adjacent to the partition layer and a decorative layer away from the partition layer. The partition layer includes a plurality of light-blocking partitions. The partitions are parallel to each other and spaced from one another at selected intervals. Every pair of adjacent partitions defines a lighting cell therebetween. The light-emitting unit includes a plurality of light-emitting points, where at least one light-emitting point is positioned to illuminate a corresponding lighting cell between a respective pair of partitions. The color pattern layer has a colored pattern. The decorative layer has a decorative pattern. The color pattern layer and decorative layer are both light-transmissive. However, when the light-emitting unit is turned off, the decorative layer blocks visibility of the color pattern layer so that the color pattern is invisible to the viewer. When the color pattern layer is backlit by the light-emitting unit, the light-emitting points each illuminate a corresponding lighting cell and the illuminated color pattern of the color pattern layer in the main unit colorizes the displayed decorative pattern of the decorative layer. The light-emitting points may be controlled and turned on sequentially, so the color pattern is gradually backlit and thus dynamically colorizes the decorative pattern on the decorative layer to provide an animated colorization effect.

The decorative device may include a mounting frame for fixedly mounting the partitions. The partitions may be mounted on an outer side of the mounting frame, and the partitions may be distributed along a longitudinal direction of the mounting frame.

The mounting frame may have a columnar structure or a cylindrical structure, and the partitions may be arranged around the mounting frame.

The mounting frame may have a planar structure, and the partitions may be mounted on one side of the mounting frame.

In an embodiment, the device may also have a mounting sleeve for fixedly mounting the partitions on the outer side of the mounting sleeve. In this case, the light-emitting unit may include a lighting column for emitting light from the entire peripheral surface of the column, inserted into the mounting sleeve. The mounting sleeve may be made of a light-transmitting material or a transparent material, or the mounting sleeve may be made of a non-light-transmitting material, and a light-transmitting hole is formed in the position, corresponding to each light-emitting point in the light source column, of the non-light-transmitting mounting sleeve in a hollowed-out mode.

Conveniently, in these embodiments with the partitions defining lighting cells, the backlights can be better controlled and can provide regionalized backlighting. Further, it is possible to provide more uniform lighting, or to animate the lighting effects. The structure of the device is relatively simple and easy to manufacture.

FIG. 3.1 illustrates an embodiment of the backlit device with dynamic backlighting as described above, which includes a light-emitting unit 110, a main unit 120, and a partition layer 130 between the light-emitting unit 110 and the main unit 120. Partition layer 130 is configured to guide light emitted from the light-emitting unit 110 towards the back side of main unit 120 to illuminate the main unit 120, including its front side.

As illustrated in FIGS. 3.2 to 3.5, the partition layer 130 includes a plurality of light-blocking partitions 131, a mounting frame 132 for fixedly mounting the partitions 131. The partitions 131 are mounted on an outer side of the mounting frame 132, and are parallelly arranged at regular intervals in a height direction of the mounting frame 132 as depicted. A lighting cell 1301 is formed between each pair of adjacent partitions 131. The light-emitting unit 110 includes at least one light-emitting point for each lighting cell 1301. Each lighting cell 1301 guides light emitted from corresponding light-emitting point(s) toward the back side of the main unit 120 to illuminate a corresponding area of the main unit 120 and the spacing space 1301. In some embodiments, a lighting cell may include a plurality of light-emitting points distributed around the mounting column 132 to emit light in all horizontal directions.

The partitions 131 prevent light/optical interference between different lighting cells. The partitions 131 may be made of a metal material, a plastic material, or an inorganic material, or the like. The partitions may have any desired shapes and sizes. In some embodiments, the surfaces of the partitions 131 may be treated to improve light reflection, and thus improving the light transmitting efficiency.

As illustrated in FIGS. 3.5, the mounting frame 132 has a columnar or a cylindrical structure. The partitions 131 are arranged around the mounting frame 132 in a circular manner. The lighting cell 1301 has an annular shape. The main unit 120 is tubular and fits over the partitions 131.

In use, the lighting cells 1301 may be illuminated individually gradually from bottom up or from top down, thus producing a dynamic lighting effect on the main unit 120. When the lighting points are mounted around the cylindrical mounting frame 132 in 360 degrees, backlighting may be provided in 360 degrees to illuminate the entire tubular surface of the main unit 120.

In other embodiments, such as those illustrated in FIGS. 3.6 to 3.8, the mounting frame 132 may be planar or plate shaped. A plate-shaped structure may be a flat panel or may have a curved surface. In such cases, the partitions 131 may be fixedly mounted on one side (the mounting side) of the mounting frame 132.

The light-emitting unit 110 may include a plurality of LED strips, each LED strip including a number of LED bulbs each forming a light-emitting point. The LED strips may be extended along the longitudinal (height) direction of the mounting frame 132 and mounted around the mounting frame 132.

In some embodiments, the light-emitting unit 110 may include an LED circuit pattern formed on the outer surface of the mounting frame 132. LED light bulbs may be connected to the LED circuit pattern to form the light-emitting points. The LED light bulbs may form a lighting ring or lighting belt within each lighting cell between two partitions 1301. Multiple lighting rings or belts may be distributed in the height direction of the mounting frame 132.

The light-emitting unit 110 may include flexible LED sheets or ribbons, which may be attached to the outer surface of the mounting frame 132 to cover the outer surface of mounting frame 312.

The lighting cell 1301 may have a ribbon or strip shape and each lighting cell 1301 may be illuminated by a LED strip or LED ribbon.

Optionally, the space between the partitions 131 may be filled with a transparent cured resin.

The light-emitting unit 110 may be controlled using a controller, such as a computing device, a microcontroller, or an integrated circuit.

In an embodiment as illustrated in FIG. 3.9, a plurality of light guide strips 140 are arranged between the light-emitting unit 110 and the partition layer 130. Each light guide strip 140 may transmit light from a light-emitting point of the light-emitting unit 110 to the corresponding lighting cell 1301. With the light guide strip 140, the LED light sources can be separated from and located away from the partition layer 130, to allow more convenient replacement and maintenance of the LED light sources. Further, as the light guide strips 140 are flexible and can be bent, the device is more convenient to install in a confined space. The light guide strip 140 may be a fiber optic or a bundle of fiber optics.

As illustrated in FIG. 3.10, the outline shape and profile of the partition layer 130 may conform to the inner contours of the main unit 120. As depicted, the main unit 120 may also have a corresponding three-dimensional external shape, which may resemble a figure such as a human face. In other embodiments, the 3D structure may resemble a plant, an animal, or the like.

The outer contour of partition layer 130 may be planar or have a curved surface, and the main unit 120 may have a corresponding planar or curved outer surface.

A visual effect of the device during use is illustrated in FIGS. 3.11A to 3.11D. FIG. 3.11A shows the unlit device which resembles a human head with 3D face features and shows the native color of the main unit, which may be formed of a black marble. In FIG. 3.11B, the top of the head is backlit and shows a white color. In FIG. 3.11C, the face is partly shown and the eyes and nose are now brightened. In FIG. 3.11D, the entire head is backlit and shown in bright white color, except the eyes and lips which may be colorized as black and red respective, as described elsewhere herein. The face may be colorized to resemble a human face more realistically as described elsewhere herein.

The main unit 120 may be formed as described elsewhere herein. For example, as illustrated in FIG. 3.12, the main unit 120 may include a substrate layer 121, a color pattern layer 122 and a decorative layer 123, which may be formed according to another embodiment described herein.

The substrate layer 121 may be formed of a light-transmitting material or a transparent material, or a non-light-transmissive material. Light-transmitting materials include a frosted glass, a plastic film, a plastic sheet, or the like. Transparent materials can be made of glass, transparent acrylic materials, or the like. Non-light-transmissive materials can be made of metal, floor tiles, ceramic tiles, porcelain tiles, stones, or the like.

When the substrate 121 is formed of a light-transmitting or transparent material, the substrate 121 may be facing the light-emitting unit 110. The color pattern layer 122 and the decorative layer 123 may be arranged on the same side of substrate 121, which is opposite to the light-emitting unit 110. Alternatively, the substrate 121 may be most away from the light-emitting unit 110 and is contact with the decorative layer 123, while the color pattern layer 122 is facing the light-emitting unit 110.

To prevent the partitions 131 from casting shadows on the displayed image on the main unit 120, the distance between the partition layer 130 and the color pattern layer 122 of the main unit 120 may be from 2 mm to 12 mm. This distance is dependent on the thickness of the partitions 131. When the thickness of a partition 131 is greater, the greater the distance between the partition 131 and the color pattern layer 120 should be. And vice versa.

Conveniently, when the substrate 121 is between the color pattern layer 122 and the partition layer 130, the separation distance can be conveniently adjusted by adjusting the thickness of the substrate 121. If the color pattern layer 122 is facing the partition layer 130, the separation distance can be obtained by providing the required space between the main unit 120 and the partition layer 130, such as by using a spacer.

When the substrate 121 is formed of a non-light-transmitting material, the substrate 121 include openings thereon to allow light to pass through the substrate 121. The openings may form a desired image or pattern. The openings may be filled with a light-transmitting material such as a resin. In this case, the color pattern layer 122 and the decorative layer 123 are sequentially arranged on the front side of substrate 121.

As described elsewhere, the color pattern layer 122 may have a color pattern formed by spray painting, hand drawing, or transfer printing (such as water transfer printing or heat transfer printing), or the color pattern layer 122 is a light-transmitting film or a light-transmitting sheet with a color pattern.

The decorative layer 123 may be formed by transfer printing (water transfer printing or heat transfer printing), spraying, painting, hand drawing, electroplating, or firing.

To form the decorative layer 123 by electroplating, a layer of polyurethane (PU) varnish (gloss oil), or UV varnish, can be spray coated on the color pattern layer 122, and cured. The desired material (such as aluminum, chromium, or another metal) may be vacuum electroplated on the cured varnish to form an electroplated film coating. Conveniently, the electroplated layer is relatively uniform and can provide a mirror effect when the device is not backlit.

In some embodiments, the decorative layer 123 may be formed of a ceramic material. In this case, the substrate 121 may be formed of glass and the color pattern may be formed on the glass using a color pigment. The substrate 121 may also be made of ceramic or porcelain. The different layers may be attached together with the light-transmitting layer by screws, buckles, adhesive, or the like.

It is noted that, when the device is not backlit, the decorative layer 123 is not transparent so the color pattern of the color pattern layer 122 is hidden behind the decorative layer and is not visible. However, when the device is backlit, the color pattern can colorize the decorative layer 123.

When the decorative layer 123 and the color pattern layer 122 are formed or processed by spray painting, transfer printing or electroplating, the thickness of the decorative layer 123 and the thickness of the color pattern layer 122 can be less than 200 μm, which may be beneficial for displaying clear or sharp images.

It is possible to provide a masking layer between the color pattern layer 122 and the backlighting light source. The masking layer may have cut-out regions corresponding to the color pattern on the color pattern layer 122. The masking layer may improve the sharpness of the colorized display image.

It is noted that a "cut-out" as referred to herein is not necessarily actually cut out of the respective layer. Rather, the "cut-out" may be formed by other means such as plating, masked printing, masked painting, masked spraying, molding, or the like. In some embodiments, a layer with a cut-out may be formed by electroplating, vacuum plating, or spray plating.

The color pattern of the color pattern layer 122 may provide any desired visual effects. For example, the color pattern may show a red flower image. The pattern of the decorative layer 123 may then show a corresponding white flower image. The patterns of the two flower images correspond to each other and overlap in space. They only differ in their colors. When the light-emitting unit 110 does not emit light, the decorative layer 123 displays a white flower diagram. When the light-emitting points of the light-emitting unit 110 are sequentially turned on, the displayed image gradually shows a red flower diagram. The red flower diagram is revealed one strip at a time to provide a dynamic coloring effect.

A further embodiment is illustrated in FIGS. 3.13 and 3.14. The device shown in these figures is similar to the device described above with references to FIGS. 3.1 to 3.12, except the tubular mounting sleeve 232 for mounting the partitions 231 of partition layer 230 and the light-emitting unit 210. The light-emitting unit 210 is generally cylindrical and inserted into the tubular mounting sleeve 232 to provide backlighting on the entire surface of the tubular mounting sleeve 232 to illuminate the lighting cells 2301 formed between the partitions 331.

The mounting sleeve 232 may be made of a light-transmitting material or a transparent material. Optionally, the mounting sleeve 232 can also be made of a non-light-transmitting material, but hollowed out to provide light-emitting points at the locations corresponding to the lighting cells 2301.

A mounting sleeve 232 may have some benefits. For example, the light source can be conveniently replaced when it is housed in the mounting sleeve 232.

A further embodiment is illustrated in FIG. 3.15, which includes a light-emitting unit 310, a main unit 320, and a partition layer 330 between the light-emitting unit 310 and the main unit 320. In this embodiment, light-transmitting channels 3301 arranged in an array are formed in the partition layer 330. The partition layer 330 may have reflective surfaces, and may include a plurality of reflective cups 331 arranged in an array. A light-transmitting channel 3301 is formed in each reflective cup 331.

As illustrated in FIG. 3.16, a plurality of light guide strips 340 may optionally be provided between the light-emitting unit 310 and the partition layer 330, the effects of which are similar to those of the light guide strips described above.

Further embodiments relate to devices that can display images with an intaglio or sunken relief effect. In addition to the layers described above, the device in these embodiments include a support or substrate that has hollowed or cut-out patterns, which may be considered, or function, as a stencil.

For example, such a device may include a backlighting unit, a substrate and a light-transmitting layer attached to the rear side of the substrate. The substrate includes one or more cut-outs. The light-transmitting layer covers the cut-out(s) at the rear side of the substrate and a color pattern is formed on or in the light-transmitting layer at the cut-out(s). A light transmissive decorative layer is further formed on and covers the front side of the device, including the substrate and portion(s) of the light-transmitting layer that is(are) exposed at the cut-out(s) of the substrate. The decorative layer thus has a concave cross-section profile at the cut-out(s) and the device has a sunken relief pattern at the cut-out(s). The backlighting unit is arranged behind the rear side of the light-transmitting layer. When the backlighting unit emits light towards the light-transmitting layer, the color pattern of the light-transmitting layer is visible from the front of the device through the decorative layer, and thus a colorized sunken relief pattern is displayed to a front viewer. When the backlighting unit does not emit light, the decorative layer hides the light-transmitting layer so that the color pattern is invisible to the front viewer.

In an embodiment, a light-transmitting decorative structure capable of achieving a sunken relief effect comprises a light-emitting unit, a light-transmitting supporting layer and a hollowed-out layer attached to the outer (front) side of the light-transmitting supporting layer, and the light-transmitting supporting layer comprises a light-transmitting supporting body and a pattern layer formed on the light-transmitting supporting body. A hollowed-out pattern is formed in the hollowed-out layer, and a color pattern corresponding to the hollowed-out pattern is formed in the pattern layer. A light transmissive decorative layer is further formed on the outer (front) side of the hollowed-out layer, the decorative layer can penetrate through the hollowed-out pattern and cover the corresponding area of the light-transmitting supporting layer, and the decorative layer is further concave in the position of the hollowed-out pattern to form a sunken relief pattern effect. The light-emitting unit is used for providing illumination. When the light-emitting unit emits light, the light of the light-emitting unit illuminates the light-transmitting supporting layer, so that the color pattern of the pattern layer is presented on the decorative layer, and a colored sunken relief pattern effect is formed. When the light-emitting unit does not emit light, the decorative layer shields or hides the pattern layer, so that the color pattern of the pattern layer is invisible from the front side of the structure.

Further embodiments relate to devices that can display images with an intaglio or sunken relief effect. In addition to the layers described above, the device in these embodiments include a support or substrate that has hollowed or cut-out patterns, which may be considered, or function, as a stencil.

For example, such a device may include a backlighting unit, a substrate with a cut-out, and layers deposited on or attached to the substrate as described herein.

As illustrated in FIG. 4.1, an embodiment of the device includes a light-emitting unit 410, a supporting layer 420, a light-transmitting layer 430 attached to the rear side of the supporting layer 420 and a decorative layer 440 covering the front side of the supporting layer 420. The light-emitting unit 410 is positioned behind the light-transmitting layer 430 and is used for directly illuminating (backlighting) the light-transmitting layer 130. The light-emitting unit 410 may be formed or constructed as other light sources described herein. The device of FIG. 4.1 is only schematically illustrated but it can include a device or article suitable for use as vases, stone panels, floor tiles, lampshades, or the like.

In some embodiments, the front surface of the light-transmitting layer 430 may be directly attached or bonded to the rear surface of the supporting layer 420. The layers 420, 430 may be attached in any suitable manner, such as by bonding, fasteners, screws, nuts and bolts, locking mechanisms, buckles, or the like.

The supporting layer 420 may be a main layer or main unit as unit 120, and provides support the light-transmitting decorative structure. The supporting layer 420 has one or more cut-outs forming a hollowed-out pattern. The hollowed-out pattern can form letters, pictures, images, sketches, or the like, and any combinations thereof.

The hollowed-out pattern of the supporting layer 420 can be formed by cutting or carving, such as die cutting, or any suitable technique.

The supporting layer 420 may be formed of any suitable transparent, translucent, or opaque material.

The light-transmitting layer 430 covers the opening(s) formed by the cut-out(s) in the supporting layer 420. For clarity, the hollowed-out pattern extends through the supporting layer 420. The light-transmitting layer 430 has a colored pattern on its front side positioned corresponding to the cut-out portions of the supporting layer 420. The colored pattern thus may have the same shape and size as the hollowed-out pattern.

The colored pattern of the light-transmitting layer 430 may be formed through spray painting, manual painting, or transfer printing. The light-transmitting layer 430 may be formed by attaching a light-transmitting film or a light-transmitting sheet with a color pattern on the front or rear side surface of the supporting layer 420.

The decorative layer 440 is light-transmissive and covers the front side of the support layer 420. The decorative layer 440 may be formed of a cured layer, which may be sprayed, spray painted, painted, or coated on the front side of the supporting layer 42 and then cured. The decorative layer 440 can thus include protrusion(s) (not shown in FIG. 4.1 but see FIG. 4.2) into the cut-out(s) of the supporting layer 420, which can contact and cover the corresponding exposed areas of the light-transmitting layer 430, and corresponding recess(es) at the front side of respective protrusion(s). Consequently, the recess(es) in the decorative layer 440 provide(s) a sunken relief effect.

As illustrated in FIG. 4.2, in an embodiment, the decorative layer 440 also covers the side walls 1201 of the cut-out and extends into the opening formed by the cut-out. The decorative layer 440 has a corresponding recess that forms a sunken relief that matches the pattern of the cut-out.

The decorative layer 440 can be formed by a water transfer printing process. For example, a film with a pattern thereon, such as wood grain, can be attached to the supporting layer 420 over the cut-out area by water bestow transfer printing to form a sunken relief pattern with the wood grain visible from the front side of the device.

The decorative layer 440 can also be printed on the supporting layer 420 over the cut-out area, with the use of a printer to form a sunken relief pattern with, e.g., marble veins, such that the device looks like made of a marble material. The decorative layer 440 can also be formed by spraying white paint over the cut-out area on the supporting layer 420 to form a white sculpture with a sunken relief. The sunken relief can be conveniently formed using water transfer printing.

The decorative layer 440 may also be formed by electroplating. In particular, a PU varnish or UV varnish may be sprayed on the front side of the supporting layer 420 and the exposed part(s) of the light-transmitting layer 430 at the cur-out(s), and then cured. A plated film is deposited or coated on the cured varnish by plating, such as electroplating, to form a plated film or coating. An electroplated layer can be uniform in structure and thickness. The electroplated layer with a controlled and suitable thickness can provide a one-way mirror effect (also referred to as a two-way mirror), which normally looks like a mirror but shows colorized images when the electroplated layer and the pattern layer are backlit.

In some embodiments, the decorative layer 440 may be formed by firing, such as bisque firing and glaze firing. The light-transmitting layer 430 in this case may be formed of glass and a color pattern may be formed on the glass by using a heat-resistant pigment. The supporting layer 420 may be formed of glass, ceramic panel, porcelain tile, or the like. The device may be used in bathrooms or in outdoor articles.

The decorative layer 440 may have a thickness of 200 μm or less to allow better light transmission and sharper images when the device is backlit.

Referring to FIGS. 4.3A to 4.3C, an embodiment of the device may exhibit a sunken relief of, for example, a pattern of a flower. FIG. 4.3A shows a supporting layer 41 (an embodiment of layer 420) having a cut-out 42 forming an image of a flower. FIG. 4.3B shows a light-transmitting layer 43 (an embodiment of layer 430) with a color pattern 44 thereon. As can been seen, the color pattern 44 matches the position and shapes of the cut-out 42. FIG. 4.3C shows the superposed or overlayed effect of the two layers 41 and 43. The light-transmitting layer 43 can be attached to the back or rear side of the supporting layer 41 in a suitable manner as described above.

Without the decorative layer 440, the color pattern on layer 43 is visible through the supporting layer 41 as illustrated in FIG. 4.3C.

FIGS. 4.3D shows a front view of the device when a decorative layer 47 with wood grain and sunken relief 48 is overlayed over the supporting layer 41, where the device is not backlit. As can been seen, the wood grain layer 47 covers and hides the supporting layer 41 and the color pattern 44 on layer 43. FIG. 4.3E shows the front view of the device when it is backlit, which exhibits a colorized image 10 of the flower and colorized wood grain pattern.

FIG. 4.4 illustrate another device with a sunken relief effect. The device includes a supporting layer 220, a stencil layer 240 attached to the front side of the supporting layer 220, and a decorative layer 250 covering the front side of the stencil layer 240. The supporting layer 220 includes a light-transmitting substrate 221 and a pattern layer 222 formed on the substrate 221. The stencil layer 240 is attached to the front side of the substrate 221. The substrate 221 is transparent or light transmissive. The stencil layer 240 has a cut-out forming a hollowed-out pattern. The pattern layer 222 has a color pattern thereon aligned with the hollowed-out pattern. Both patterns have the same shape and are spatially aligned. A light-emitting unit 210 is arranged on the rear (light incident) side of the substrate 221 and is used for directly illuminating the substrate 221. The light-emitting unit 210 may include any of the light sources described herein.

Products with the above features may be used in household items or articles, such as decorative pictures, screens, vases, lampshades, or the like.

The pattern layer 222 may be a color layer formed using an inkjet printer, or by manual drawing or transfer printing on a side surface of the substrate 221, or may be formed by attaching a light-transmitting film or a light-transmitting sheet having a color pattern to a side surface of the substrate 221. The substrate 221 may be transparent as in other transparent supports or substrates described herein. The pattern layer 222 may be formed on either the front side or the rear side of the substrate 221.

For example, when the substrate 221 is transparent, e.g., formed of a transparent glass, the pattern layer 222 may be formed on the front side the substrate 221 as illustrated in FIG. 4.4. In this case, the pattern layer 222 may be attached to the rear side of stencil layer 240. The light-emitting unit 210 may be positioned behind the support layer 220 adjacent to the rear side of the support layer 220.

Alternatively, the light-emitting unit 210 may be disposed at an edge of the supporting layer 220 and emits light into the light-transmitting support layer 220 for illuminating the back of layer 240, as illustrated in FIG. 4.5.

To facilitate transmission of light emitted from the light-emitting unit 210 towards the back side of the stencil layer 240, the substrate 221 may be a light-guide or include a light-guiding material. For example, the substrate 221 may be formed of an acrylic light guide panel. The edge surface of the substrate 221 facing the light-emitting unit 210 is the light-incident surface, and the front surface of the substrate 221 is the light-existing surface.

The substrate 221 may be formed using a PE material by rotational molding. The outer surface of the molded PE panel may be subjected to firing and sand-blasting treatment to improve surface adhesion properties for later plating or coating of the color materials or varnish.

The stencil layer 240 can be formed of a sheet material such as a metal or plastic sheet. The cut-out can form any hollowed-out pattern, such as letters, figures, drawings, or pictures, or the like. The hollowed-out pattern of the stencil layer 240 can be formed by cutting and by another method such as molding.

The supporting layer 220 covers the opening of the hollowed-out pattern in the stencil layer 240 from the rear side of layer 240. The support layer 220 and the stencil layer 240 together thus form a sealed cavity at the cut-out area.

The decorative layer 250 is light transmitting and covers the front surface of the stencil layer 240. The decorative layer 250 may be formed in like other decorative layers described herein. The decorative layer 250 also forms a sunken relief at the cut-out of the stencil layer 240, as described above with reference to FIGS. 4.1 and 4.2.

As shown in FIG. 4.6, structures of decorative layer 250, stencil layer 240, and supporting layer 220 may be similar to the layers 120, 130 and 140 shown in FIGS. 4.1. and 4.2, except that the supporting layer 220 in FIG. 4.6 includes substrate 221 and layer 222. In particular, the decorative layer 250 may be formed by electroplating or another suitable plating technique as described herein. The side wall 2401 of the opening in the cut-out of stencil layer 240 is also covered by the decorative layer 250.

An embodiment relates to a light-transmissive ornament comprising a color pattern layer, a decorative pattern layer and a light source, wherein the color pattern layer and the decorative pattern layer are connected to each other and have light transmission properties; a color pattern is formed in the color pattern layer, and a decorative pattern is formed in the decorative pattern layer; the decorative pattern and the color pattern correspond to each other and have different colors; a light-emitting end of the light source is arranged opposite the color pattern layer; and when the light source emits light, the light is emitted to the color pattern layer such that the color of the color pattern is displayed on the decorative pattern.

In an embodiment, the light-transmissive ornament further comprises a light-transmissive supporting layer arranged between the color pattern layer and the decorative pattern layer, or on the side of the color pattern layer away from the decorative pattern layer, or on the side of the decorative pattern layer away from the color pattern layer. In an embodiment, the light-transmissive supporting layer, the color pattern layer, and the decorative pattern layer are sequentially arranged, and the light-transmissive ornament further comprises a light-transmissive layer arranged between the color pattern layer and the decorative pattern layer. In an embodiment, the light-transmissive supporting layer is a light guide layer having a light incident surface located on a side surface and a light emergent surface located at an end portion, wherein the light emergent surface is arranged opposite the color pattern layer, and the light source is arranged opposite the light incident surface. In an embodiment, the light guide layer is provided with two light emergent surfaces located at two ends of the light guide layer, and the light-transmissive ornament further comprises a reflecting layer, the reflecting layer being arranged on the side of the light-transmissive supporting layer away from the color pattern layer and being arranged in close contact with a respective light emergent surface. In an embodiment, the decorative pattern completely or at least partially corresponds to the color pattern. In an embodiment, the light source is arranged on the side of the light-transmissive supporting layer away from the color pattern layer, and is arranged opposite the light-transmissive supporting layer. In an embodiment, at least one mounting recess is provided on the side of the light-transmissive supporting layer away from the color pattern layer, and the light source is arranged in the mounting recess. In an embodiment, an accommodation cavity is provided in the light-transmissive supporting layer; the color pattern layer, the light-transmissive layer and the decorative pattern layer are sequentially arranged on an outer wall of the light-transmissive supporting layer; and the light source is arranged in the accommodation cavity. In an embodiment, the color pattern and the decorative pattern are planar patterns or three-dimensional patterns. In an embodiment, the light-transmissive supporting layer, the color pattern layer, the light-transmissive layer, and the decorative pattern layer sequentially correspond to each other. In an embodiment, a relief or an intaglio is provided on the side of the light-transmissive supporting layer close to the color pattern layer, and the color pattern layer, the light-transmissive layer and the decorative pattern layer are in close contact with the light-transmissive supporting layer. In an embodiment, a relief or an intaglio is provided on the side of the light-transmissive layer away from the color pattern layer, and the decorative pattern layer is in close contact with the light-transmissive layer. In an embodiment, the light-transmissive layer has a thickness less than 1 mm. In an embodiment, the light-transmissive ornament further comprises a frame, wherein the light-transmissive supporting layer is arranged in the frame and connected to an inner wall of the frame. In an embodiment, the light-transmissive layer is white. In an embodiment, when no light is emitted by the light source, the light-transmissive layer completely covers the color pattern such that the color pattern is concealed; and when the light source emits light, the color pattern is transmitted through the light-transmissive layer and displayed on the decorative pattern layer. In an embodiment, the decorative pattern only corresponds to part of the color pattern, and when the light source emits light, the color pattern and the colored decorative pattern are jointly exhibited on the decorative pattern layer. In an embodiment, the color pattern layer, the light-transmissive layer, and the decorative pattern layer are sequentially printed/manually drawn on the light-transmissive supporting layer. In an embodiment, the light-transmissive supporting layer is a light-transmissive stone plate layer, and the color pattern layer and the decorative pattern layer partially cover the light-transmissive stone plate layer.

In another embodiment, a light-transmissive ornament is provided, which comprises a color pattern layer, a decorative pattern layer and a light source, wherein the color pattern layer and the decorative pattern layer are connected to each other and have light transmission properties; a color pattern is formed in the color pattern layer, and a decorative pattern is formed in the decorative pattern layer; the decorative pattern and the color pattern correspond to each other and have different colors; a light-emitting end of the light source is arranged opposite the color pattern layer; and when the light source emits light, the light is emitted to the color pattern layer such that the color of the color pattern is displayed on the decorative pattern. The light-transmissive ornament may further comprise a light-transmissive supporting layer arranged between the color pattern layer and the decorative pattern layer, or on the side of the color pattern layer away from the decorative pattern layer, or on the side of the decorative pattern layer away from the color pattern layer. The light-transmissive supporting layer, the color pattern layer and the decorative pattern layer may be sequentially arranged, and the light-transmissive ornament may further comprise a light-transmissive layer arranged between the color pattern layer and the decorative pattern layer. The light-transmissive supporting layer may be a light guide layer having a light incident surface located on a side surface and a light emergent surface located at an end portion, wherein the light emergent surface is arranged opposite the color pattern layer, and the light source may be arranged opposite the light incident surface. The light guide layer may be provided with two light emergent surfaces located at two ends of the light guide layer, and the light-transmissive ornament may further comprise a reflecting layer, the reflecting layer being arranged on the side of the light-transmissive supporting layer away from the color pattern layer and being in close contact with a respective light emergent surface. The decorative pattern may completely or at least partially correspond to the color pattern. The light source may be arranged on the side of the light-transmissive supporting layer away from the color pattern layer, and may be arranged opposite the light-transmissive supporting layer, or embedded in the light-transmissive supporting layer. At least one mounting recess may be provided on the side of the light-transmissive supporting layer away from the color pattern layer, and the light source may be arranged in the mounting recess. An accommodation cavity may be provided in the light-transmissive supporting layer. The color pattern layer, the light-transmissive layer and the decorative pattern layer may be sequentially arranged on an outer wall of the light-transmissive supporting layer, and the light source may be arranged in the accommodation cavity. The color pattern and the decorative pattern may be planar patterns or three-dimensional patterns. The light-transmissive supporting layer, the color pattern layer, the light-transmissive layer, and the decorative pattern layer may sequentially correspond to one another. A relief or intaglio may be provided on the side of the light-transmissive supporting layer close to the color pattern layer, and the color pattern layer, the light-transmissive layer and the decorative pattern layer may be in close contact with the light-transmissive supporting layer. A relief or intaglio may be provided on the side of the light-transmissive layer away from the color pattern layer, and the decorative pattern layer may be in close contact with the light-transmissive layer. The light-transmissive layer may have a thickness less than 1 mm. The light-transmissive ornament may comprise a frame, wherein the light-transmissive supporting layer is arranged in the frame and connected to an inner wall of the frame. The light-transmissive layer may be white. The decorative pattern may only correspond to part of the color pattern, and when the light source emits light, the color pattern and the colored decorative pattern may be shown in a superposed image exhibited on the decorative pattern layer. The color pattern layer, the light-transmissive layer and the decorative pattern layer may be sequentially printed/manually drawn on the light-transmissive supporting layer. The light-transmissive supporting layer may be a light-transmissive stone plate layer, and the color pattern layer and the decorative pattern layer may partially cover the light-transmissive stone plate layer. In an embodiment, a relief or an intaglio may be provided on the side of the light-transmissive supporting layer close to the color pattern layer, and the color pattern layer, the light-transmissive layer and the decorative pattern layer may be in close contact with the light-transmissive supporting layer.

In this disclosure, "silvering" is used in its broad sense as understood by those skilled in the art to refer to a process of coating a substrate, such as a glass or plastic substrate, with a reflective solid substance to form a mirror, and the "silvering" substance may be silver or any other suitable metal, alloy, or metal oxides for providing a smooth and reflective surface that provides the mirror effect.

In different embodiments, the silvering material may be plated or coated on the substrate using different deposition techniques depending on the substrate material, such as traditional chemical silvering techniques, fire gilding techniques, or various known plating or deposition techniques including electroplating, electrodeless deposition, vapor deposition/plating, vacuum deposition/plating, spraying, painting, printing, or the like.

Example I

In this example, a device with partitions and light cells as described herein may be prepared as follow.

For the purpose of this example, it is assumed that the light source is an LED strip including 144 LED light bulbs as lighting points. The light strip may include surface mounted devices (SMD), such as SMD 2835 LED light strips. These chips have sizes of 2.8 mm by 3.5 mm. For example, acrylic light guiding sheets sold under the tradename ACYLITE™ may be suitable, which include edge lit acrylic sheets.

The distance between the adjacent lighting points (centers of the lighting points) is 6.95 mm. Each lighting bulb is individually controllable. The light guide may include light guide strips of 400 mm in length, 6.7 mm in width, and 4 mm in thickness. Commercially available acrylic light guiding sheets may be used to produce the light guide strips.

Acrylic light guiding sheets may also be subject to laser dotting to produce regularly distributed light defecting/reflecting spots, such as by using a laser spotting machine.

The dotted light guiding sheets may be cut, such as with laser cutting, into the light guiding strips described above.

Partition strips, which blocks transmission of light, may be provided in sizes of 0.25 mm thick, 400 mm long and 4 mm wide. The partition strips may be formed by cutting white light-reflective sheets, such as aluminum foils, reflective paper, or reflective tape.

A color pattern layer is formed of fiber glass panels or sheets, which have a thickness of 3 mm and are 1 m long and 400 mm wide. Colored images are spray painted on the surface of the glass.

Light diffusion panels are formed using a light diffusion material or sheet, which may also have the size of 1 m by 400 mm and about 1 mm thick.

During the assembly processing, the light diffusion panel is placed flat on the glass panel for the color pattern layer. The light guide strips may be placed on the light diffusion panel, substantially in parallel and spaced as described above. For example, 144 light guide strips may be evenly arranged on a single light diffusion panel, with the lasered dots on the top side. Inserting a light partition strip between each two adjacent light guide strips (i.e., 143 partition strips were used for isolating 144 parallel light guiding strips).

The glass pane, light diffusion panel, liquid guide strips, and partition strips are affixed in place by a suitable technique such as curing or adhesive.

The LED light strip is attached or mounted adjacent to the light incident edge of the light diffusion panel. Both ends of each light guiding strip may be provided with respective lighting points. The completed panel device may be mounted in a frame, such as a picture frame. A white light reflecting sheet (400 mm wide, 1 m long, and 2 mm thick) may be used to cover the array of light guiding strips. The assembled sheets may be clamped, bounded, or otherwise affixed or fastener together. A backing panel may be mounted at the rear side of the frame, and batteries and a light controller may be mounted and housed between the assembled device and the backing panel in the frame.

Example II

A device similar to the device in Example I may be similarly formed with the exception that the light guiding strips are formed by laser curing an acrylic light guiding sheet into the desired arrangement of light guiding strips, without severing one end of the strips so the strips are still connected at the unsevered ends. The strips may have gaps that are, for example, 394 mm long, for the sheets of the sizes as described in Example I. The laser cut strips are thus still connected to one another and are easier to handle and process.

Concluding Remarks

It is to be understood that the figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the subject matter disclosed herein.

In addition, any specific numerical value listed herein includes a margin of error of +/−10%.

It will be understood that any range of values herein is intended to specifically include any intermediate value or sub-range within the given range, and all such intermediate values and sub-ranges are individually and specifically disclosed.

It will also be understood that the word "a" or "an" is intended to mean "one or more" or "at least one," and any singular form is intended to include plurals herein.

It will be further understood that the term "comprise," including any variation thereof, is intended to be open-ended and means "include, but not limited to," unless otherwise specifically indicated to the contrary.

When a list of items is given herein with an "or" before the last item, any one of the listed items or any suitable combination of two or more of the listed items may be selected and used.

Of course, the above described embodiments of the present disclosure are intended to be illustrative only and in no way limiting. The described embodiments are susceptible to many modifications of form, arrangement of parts, details, and order of operation. The invention, rather, is intended to encompass all such modification within its scope, as defined by the claims.

What is claimed is:

1. A backlit device for displaying an image having variable colors, comprising:
   a substrate;
   a light-transmissive coloring layer painted or laminated on the substrate, the coloring layer comprising a plurality of colorants of different colors and having a rear side in contact with the substrate and a varnished front side;
   a display layer comprising a silvering material directly plated on the varnished front side of the coloring layer, the display layer comprising a display pattern forming a visible displayed image, the silvering material comprising a metal, a metalloid, or an oxide thereof to form a one-way-mirror; and
   an illuminator configured and positioned to illuminate the coloring layer from the rear side of the coloring layer,
   wherein (i) when the coloring layer is unilluminated by the illuminator, the unilluminated coloring layer is hidden behind the one-way-mirror, and (ii) when the coloring layer is illuminated by the illuminator, the illuminated coloring layer visibly colorizes the displayed image through the one-way-mirror.

2. The device of claim 1, wherein the silvering material is electroplated, vacuum-plated, or spray-plated on the varnished front side of the coloring layer.

3. The device of claim 1, wherein the silvering material comprises aluminum, titanium, chromium, silver, titanium dioxide ($TiO_2$), or silica.

4. The device of claim 1, wherein the varnished front side of the coloring layer comprises a varnish coating, the varnish coating comprising an acrylic resin, a polyurethane, polycarbonate, or polyvinyl acetate.

5. The device of claim 4, wherein the varnish coating is transparent, or is translucent and comprises a white pigment.

6. The device of claim 1, the substrate is light-transmissive and the illuminator is attached to the substrate.

7. The device of claim 6, wherein the illuminator comprises a light source positioned at an edge of the substrate and a light guide for guiding light emitted from the light source to the coloring layer through the substrate.

8. The device of claim 1, wherein the illuminator comprising a light source embedded or enclosed in the substrate.

9. The device of claim 1, wherein the display pattern of the display layer comprises a three-dimensional structure.

10. The device of claim 1, wherein the substrate comprises a three-dimensional structure, the coloring layer is laminated on the three-dimensional structure, and the display layer is of a uniform thickness such that the displayed image of display layer exhibits the three-dimensional structure.

11. The device of claim 1, wherein the coloring layer has a three-dimensional structure, and the display layer is of a uniform thickness such that the displayed image exhibits the three-dimensional structure.

12. The device of claim 1, wherein the illuminator comprises a plurality of light sources.

13. The device of claim 1, wherein the substrate comprises a glass, plastic, acrylic polymer, or cured light-transmissive resin.

14. The device of claim 1, wherein the substrate comprises a masking layer, the masking layer comprising one or more openings allowing light emitted from the illuminator to pass therethrough and illuminate one or more corresponding selected portions of the coloring layer.

15. The device of claim 1, wherein the display layer comprises a spacing layer between the silvering material and the display pattern.

16. The device of claim 1, wherein the display layer comprises a light-transmissive coating covering the display pattern.

17. A method of forming a device for displaying an image with variable colors, comprising:
   painting or laminating a light-transmissive coloring layer on a substrate, the coloring layer comprising a plurality of colorants of different colors and having a rear side in contact with the substrate and a front side;
   applying a varnish to the coloring layer to form a varnish coating on the front side of the coloring layer;
   plating a silvering material on the varnish coating to form a one-way-mirror;
   forming a display pattern on the silvering material to provide a visible displayed image; and
   attaching to the substrate an illuminator positioned and configured to illuminate the coloring layer from the rear side of the coloring layer;
   wherein the silvering layer has a thickness such that (i) when the coloring layer is unilluminated by the illuminator, the unilluminated coloring layer is hidden behind the one-way-mirror, and (ii) when the coloring layer is illuminated by the illuminator, the illuminated coloring layer visibly colorizes the displayed image through the one-way-mirror.

18. The method of claim 17, wherein the plating comprises electroplating, vacuum-plating, or spray-plating.

19. The method of claim 17, wherein the silvering material comprises aluminum, titanium, chromium, silver, titanium dioxide ($TiO_2$), or silica.

20. The method of claim 17, wherein the varnish coating comprises an acrylic resin, a polyurethane, polycarbonate, or polyvinyl acetate.

* * * * *